(12) United States Patent
Sakata et al.

(10) Patent No.: US 10,700,558 B2
(45) Date of Patent: Jun. 30, 2020

(54) WIRELESS POWER TRANSMISSION SYSTEM

(71) Applicant: Panasonic Intellectual Property Management Co., Ltd., Osaka (JP)

(72) Inventors: Tsutomu Sakata, Osaka (JP); Eiji Takahashi, Nara (JP); Satoru Kikuchi, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 174 days.

(21) Appl. No.: 16/009,955

(22) Filed: Jun. 15, 2018

(65) Prior Publication Data

US 2018/0294678 A1 Oct. 11, 2018

Related U.S. Application Data

(63) Continuation of application No. 15/266,381, filed on Sep. 15, 2016, now abandoned.

(30) Foreign Application Priority Data

Nov. 20, 2015 (JP) .................................. 2015-227881

(51) Int. Cl.
*H01F 27/42* (2006.01)
*H01F 37/00* (2006.01)
(Continued)

(52) U.S. Cl.
CPC .............. *H02J 50/50* (2016.02); *H02J 50/10* (2016.02); *H02J 50/12* (2016.02); *H02J 50/40* (2016.02); *H02J 50/80* (2016.02)

(58) Field of Classification Search
CPC .. H02J 50/12; H02J 50/80; H02J 50/40; H02J 50/10; H02J 50/50
See application file for complete search history.

(56) References Cited

U.S. PATENT DOCUMENTS

| 2012/0235502 | A1* | 9/2012 | Kesler | H02J 7/025 307/104 |
| 2012/0306262 | A1* | 12/2012 | Taguchi | B60L 3/00 307/9.1 |
| 2014/0091635 | A1* | 4/2014 | Sugino | H02J 5/005 307/104 |

FOREIGN PATENT DOCUMENTS

| JP | 6-100031 | 4/1994 |
| JP | 2010-154592 | 7/2010 |

OTHER PUBLICATIONS

The Extended European Search Report dated Jan. 9, 2017 for the related European Patent Application No. 16189410.0.

* cited by examiner

*Primary Examiner* — Rexford N Barnie
*Assistant Examiner* — Rasem Mourad
(74) *Attorney, Agent, or Firm* — Renner, Otto, Boisselle & Sklar, LLP

(57) ABSTRACT

A wireless power transmission system includes: a power transmitting device; a power receiving device; and a relay device. In a state where the relay side switch circuit has the relay side rectifier and the relay side load in a non-contact state, and the receiving side switch circuit has the receiving side rectifier and the receiving side load in a non-contact state, power is transmitted from the power transmitting device to the power receiving device via the relay device. After a DC voltage output from the receiving side rectifier reaching a requested voltage of the power receiving device, the receiving side switch circuit connects the receiving side rectifier to the receiving side load at a timing T2 that is different from a timing T1 at which the relay side switch circuit connects the relay side rectifier to the relay side load.

8 Claims, 18 Drawing Sheets

Related U.S. Application Data

(60) Provisional application No. 62/236,324, filed on Oct. 2, 2015.

(51) Int. Cl.
*H01F 38/00* (2006.01)
*H02J 50/50* (2016.01)
*H02J 50/10* (2016.01)
*H02J 50/80* (2016.01)
*H02J 50/12* (2016.01)
*H02J 50/40* (2016.01)

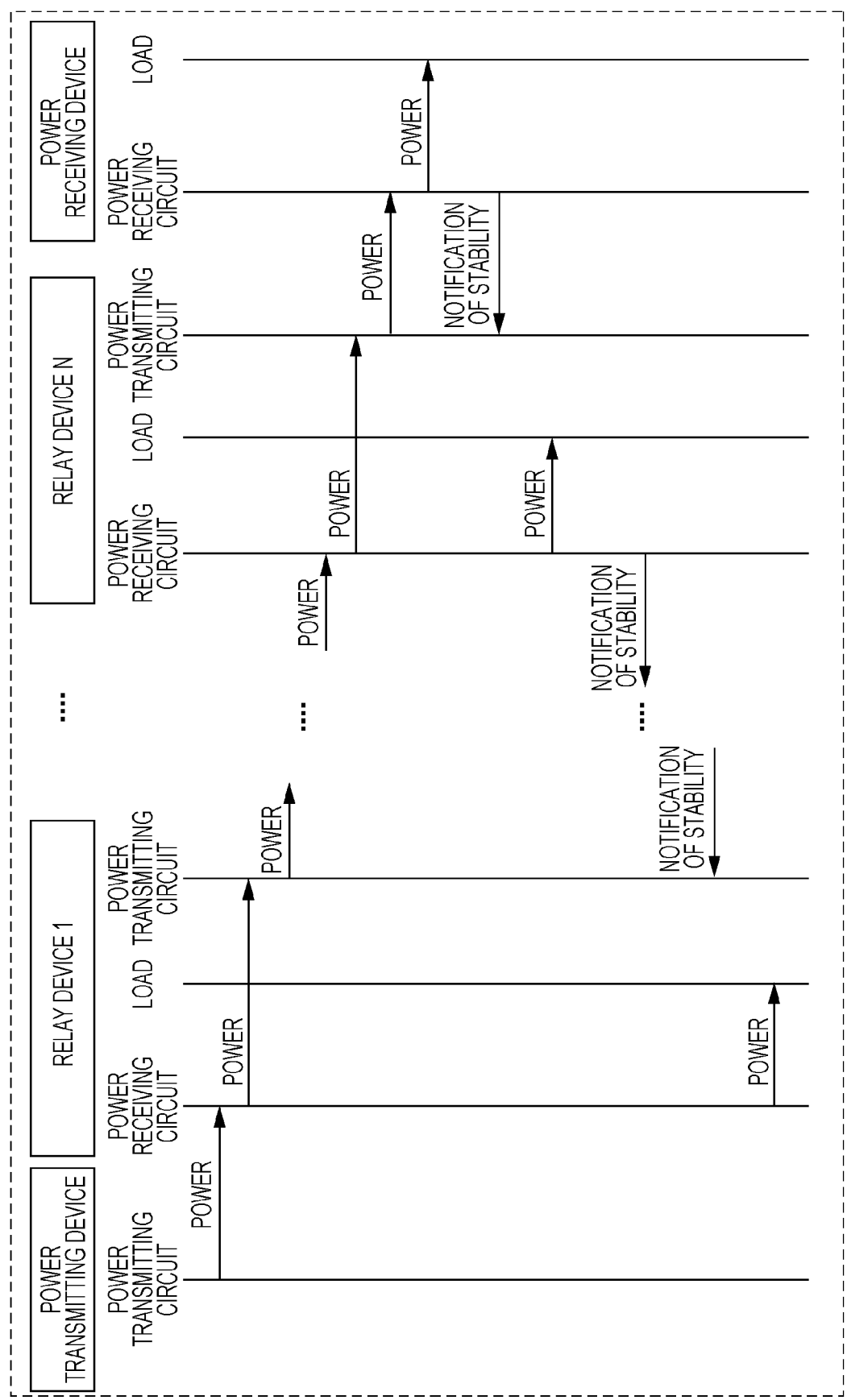

WIRELESS POWER TRANSMISSION SYSTEM

BACKGROUND

1. Technical Field

The present disclosure relates to a wireless power transmission system that transmits electric power wirelessly.

2. Description of the Related Art

In recent years, there has been advance in development of wireless (non-contact) power transmission technology, where electric power is transmitted wirelessly (non-contact) to devices that move, such as cellular phones, electric vehicles, and so forth. For example, Japanese Unexamined Patent Application Publication No. 2010-154592 discloses a wireless power transmission system that performs power transmission using magnetic resonance. In this system, even in a case where there is only one power receiving device within a power delivery range of one power transmitting device, magnetic resonance is used to transmit power to yet another power receiving device. Accordingly, power is supplied to multiple loads.

A configuration to supply power to multiple loads is also disclosed in Japanese Unexamined Patent Application Publication No. 06-100031, which discloses supplying power to multiple storages from a power source unit by cable, not wirelessly. Disclosed therein is sequentially supplying power from the power source unit to the storages via an asynchronous start circuit, with a predetermined amount of time difference, when activating the storages by the power source unit.

The conventional art has had room for improvement regarding safety in operations when activating, in a wireless power transmission system where one or more relay devices are situated between a power transmitting device and power receiving device and multiple loads are driven.

SUMMARY

In one general aspect, the techniques disclosed here feature a wireless power transmission system including: a power transmitting device; a power receiving device; and a relay device disposed between the power transmitting device and the power receiving device; the power transmitting device including a transmitting side inverter circuit that converts transmitting side DC power supplied from an external power source into transmitting side AC power, and a transmitting side power transmitting antenna that wirelessly transmits the transmitting side AC power, the relay device including a relay side power receiving antenna that receives the transmitting side AC power, a relay side rectifier that converts the transmitting side AC power into relay side DC power, a relay side inverter circuit that converts the relay side DC power into relay side AC power, a relay side load that is supplied at least part of the relay side DC power by the relay side rectifier, a relay side switch circuit that is disposed between the relay side rectifier and the relay side load, and that switches contact/non-contact state between the relay side rectifier and the relay side load, and a relay side power transmitting antenna that wirelessly transmits the relay side AC power, the power receiving device including a receiving side power receiving antenna that receives the relay side AC power, a receiving side rectifier that converts the relay side AC power into receiving side DC power, a receiving side load that is supplied at least part of the receiving side DC power by the receiving side rectifier, and a receiving side switch circuit that is disposed between the receiving side rectifier and the receiving side load, and that switches contact/non-contact state between the receiving side rectifier and the receiving side load, wherein in a state where the relay side switch circuit has the relay side rectifier and the relay side load in a non-contact state, and the receiving side switch circuit has the receiving side rectifier and the receiving side load in a non-contact state, the transmitting side AC power is transmitted from the transmitting side power transmitting antenna to the relay side power receiving antenna, and the relay side AC power is transmitted from the relay side power transmitting antenna to the receiving side power receiving antenna, and wherein after a voltage of the receiving side DC power reaching a requested voltage of the power receiving device, the receiving side switch circuit connects the receiving side rectifier to the receiving side load at a timing T2 that is different from a timing T1 at which the relay side switch circuit connects the relay side rectifier to the relay side load.

According to an embodiment of the present disclosure, operations when activating can be stabilized in a wireless power transmission system where one or more relay devices are situated between a power transmitting device and power receiving device and multiple loads are driven.

It should be noted that general or specific embodiments may be implemented as a system, a method, an integrated circuit, a computer program, a storage medium, or may be implemented as any selective combination of a system, a device, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 13B is a sequence diagram illustrating an example of operations when activating in the wireless power transmission system having multiple relay devices;

DETAILED DESCRIPTION

Underlying Knowledge Forming Basis of the Present Disclosure

Figure 1:
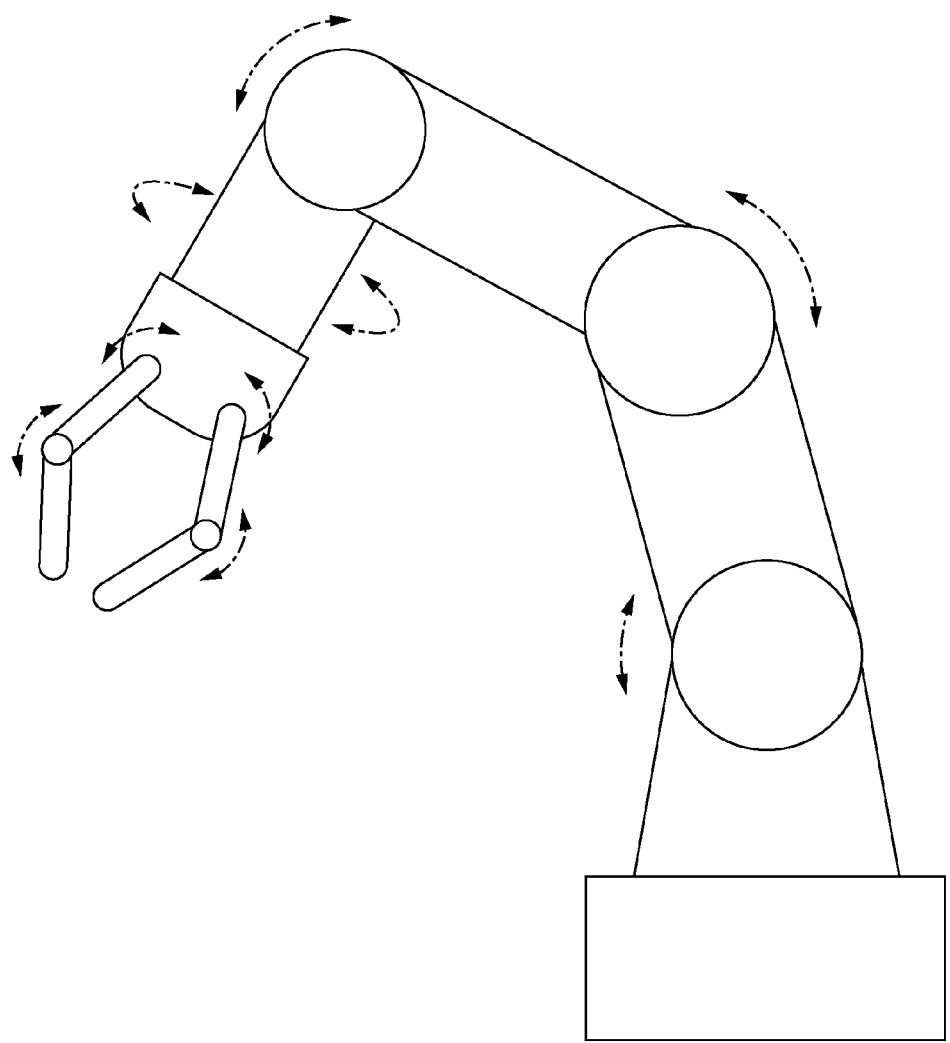
FIG. 1 is a diagram illustrating an example of a wireless power transmission system having multiple loads.

The underlying knowledge forming a basis of the present disclosure will be described before describing embodiments of the present disclosure. The present inventors are studying a multi-stage connection where one or more relay devices are disposed between a power transmitting device and a power receiving device, to form a wireless power transmission system having a multi-stage connection for driving multiple leads (hereinafter, also referred to as "cascade connection"). Such a wireless power transmission system is suitably applied to a device such as a robot arm having multiple loads (e.g., motors), or the like. The robot arm illustrated in FIG. 1 has multiple portions that rotate or move by motors. Accordingly, each motor individually needs to be supplied with electric power and controlled.

Figure 2:
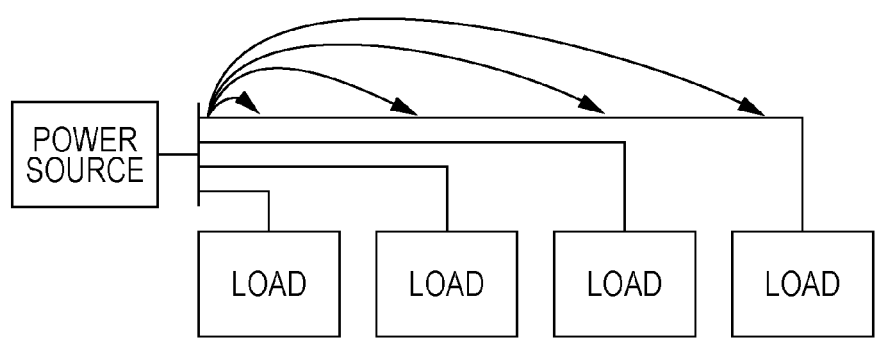
FIG. 2 is a diagram illustrating a system for supplying electric power from a power source to each load by many cables.

In a device having such multiple moving parts, electric power has conventional been supplied to each load by multiple cables. FIG. 2 is a diagram schematically illustrating such a conventional configuration. The configuration illustrated in FIG. 2 has electric power supplied to multiple loads from a power source by cabled bus connections.

However, such a configuration is prone to accidents due to snagging cables, mobility range is limited, exchanging parts is not easy, and so forth. Accordingly, the present inventors are studying supplying power from the power source to the load using wireless power transmission, and eliminating the cables from the power source.

Figure 3:
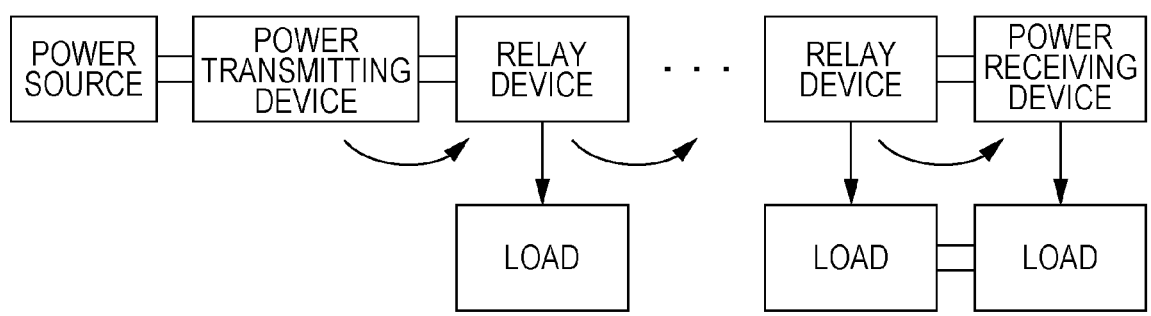
FIG. 3 is a diagram schematic illustrating the configuration of a wireless power transmission system according to a comparative example of the present disclosure.

FIG. 3 is a diagram schematically illustrating the configuration of a wireless power transmission system according to a comparative example of the present disclosure. This wireless power transmission system has a cascade connection configuration where multiple relay devices are connected between a power transmitting device and a power receiving device. The relay devices and the power receiving device are each connected to loads. Although the number of relay devices is multiple in this example, the number of relay devices may be one.

In a cabled system using a bus connection, generally, all loads conduct when the power source is turned on. Conversely, in a wireless power transmission system using a cascade connection, power is supplied in order from the load connected to the relay device close to the power source. However, study made by the present inventors has shown that the configuration of the comparative example illustrated in FIG. 3 has the following problems.

(1) When starting power transmission, the loads receive power supply immediately after various types of control circuits (e.g., microcontrollers or the like controlling inverter circuits in the relay devices) in the wireless power transmission system are activated, so there are cases where control circuits stop due to voltage drop. As a result, power cannot be supplied to the loads in a stable manner.

(2) All loads receive power supply all at once after the various types of control circuits in the wireless power transmission system are activated, so excess current flows at the time of supplying power to loads due to transient response. As a result, the loads cannot operate as expected.

Figure 4A:
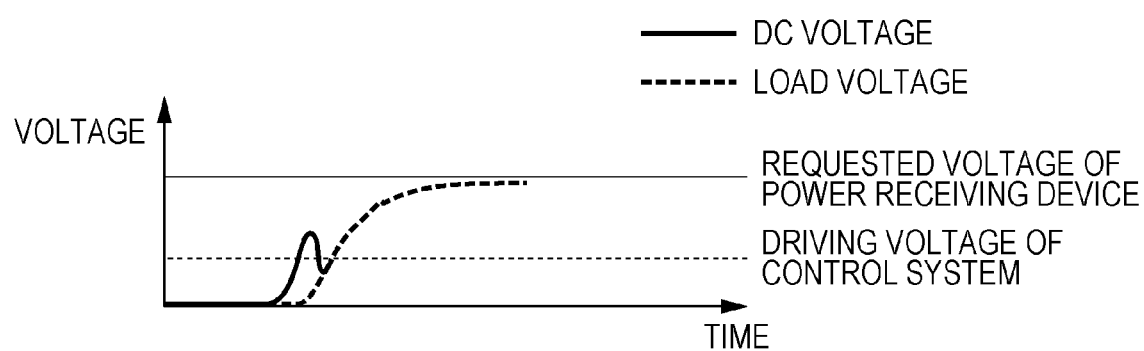
FIG. 4A is a diagram for describing problems of the comparative example.

FIG. 4A is a diagram describing the above problem of the configuration of the comparative example in detail. FIG. 4A illustrates the DC voltage output from the rectifier to the inverter circuit in each of the relay devices, and the temporal change of voltage (load voltage) applied to the load. In a case where the wireless power transmission system connects to the load to supplies power at the time of activation, the loads are connected immediately after the relay devices receive power. As a result, the loads at the relay devices are connected in a state where the DC voltage has not reached a predetermined value (e.g., a value of voltage which the power receiving device requests). This may cause a voltage drop where the voltage is temporarily lower than a voltage necessary to drive the control circuit (called control system drive voltage). In such a state, driving of the inverter circuit within the relay device becomes impossible, and an uncontrollable situation will arise.

The present inventors have found the above-described problems in the wireless power transmission system that supplies power to multiple loads via relay devices, and have studied configurations to solve these problems. From this study, the present inventors have arrived at a conception that these problems can be solved by load connection being performed with staggered timings after power transmission power has been established. The term "power transmission power has been established" means that a predetermined voltage necessary for stable operations, that the power receiving device requests (referred to as requested voltage of the power receiving device in the present specification), is satisfied.

Figure 4B:
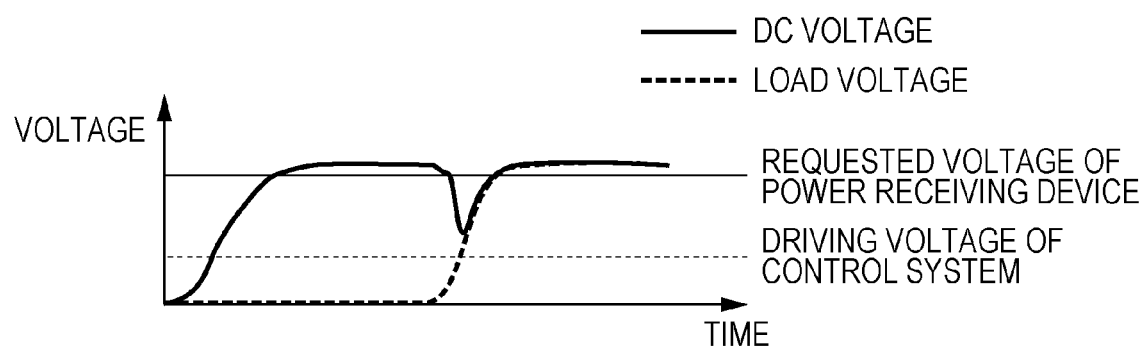
FIG. 4B is a diagram illustrating an example of temporal change of DC voltage and load voltage in the configuration of an embodiment of the present disclosure.

FIG. 4B is a diagram illustrating an example of temporal change of DC voltage and load voltage in a configuration of an embodiment of the present disclosure where a load is connected after power transmission power has been established. In this example, connection of the load is performed in a state where the DC voltage output by the rectifying circuit in the relay devices satisfies the requested voltage of the power receiving device. Now, the requested voltage of the power receiving device is set to a voltage sufficiently high value to where it is not smaller than the driving voltage of the DC voltage control system even if there is a voltage drop due to connecting the load. Accordingly, control can be continued without the DC voltage falling below the driving voltage in an embodiment of the present disclosure. In an embodiment of the present disclosure, further, load connection is performed at a staggered timing after power transmission power has been established. Thus, stable activation can be performed without an uncontrollable state occurring.

Overview of Embodiments of the Present Disclosure

A wireless power transmission system according to an aspect of the present disclosure includes:
a power transmitting device;
a power receiving device; and
a relay device disposed between the power transmitting device and the power receiving device;
the power transmitting device including
a transmitting side inverter circuit that converts transmitting side DC power supplied from an external power source into transmitting side AC power, and
a transmitting side power transmitting antenna that wirelessly transmits the transmitting side AC power,
the relay device including
a relay side power receiving antenna that receives the transmitting side AC power,
a relay side rectifier that converts the transmitting side AC power into relay side DC power,
a relay side inverter circuit that converts the relay side DC power into relay side AC power,
a relay side load that is supplied at least part of the relay side DC power by the relay side rectifier,
a relay side switch circuit that is disposed between the relay side rectifier and the relay side load, and that switches contact/non-contact state between the relay side rectifier and the relay side load, and
a relay side power transmitting antenna that wirelessly transmits the relay side AC power,
the power receiving device including
a receiving side power receiving antenna that receives the relay side AC power,
a receiving side rectifier that converts the relay side AC power into receiving side DC power,
a receiving side load that is supplied at least part of the receiving side DC power by the receiving side rectifier, and
a receiving side switch circuit that is disposed between the receiving side rectifier and the receiving side load, and that switches contact/non-contact state between the receiving side rectifier and the receiving side load,
wherein in a state where the relay side switch circuit has the relay side rectifier and the relay side load in a non-contact state, and the receiving side switch circuit has the receiving side rectifier and the receiving side load in a non-contact state, the transmitting side AC power is transmitted from the transmitting side power transmitting antenna to the relay side power receiving antenna, and the relay side AC power is transmitted from the relay side power transmitting antenna to the receiving side power receiving antenna,
and wherein after a voltage of the receiving side DC power reaching a requested voltage of the power receiving device, the receiving side switch circuit connects the receiving side rectifier to the receiving side load at a timing T2 that is different from a timing T1 at which the relay side switch circuit connects the relay side rectifier to the relay side load.

According to the above configuration, connection of the relay side rectifier and relay side load, and connection of the receiving side rectifier and receiving side load, are performed after the voltage of the receiving side DC power reaches the requested voltage of the power receiving device. Further, connection of the former and connection of the latter are performed at different timings.

Accordingly, the following problem of the comparative example can be solved.
(1) When starting power transmission, the loads receive power supply immediately after various types of control circuits (e.g., microcontrollers or the like controlling inverter circuits in the relay devices) in the wireless power transmission system are activated, so there are cases where control circuits stop due to voltage drop. As a result, power cannot be supplied to the loads in a stable manner.
(2) All loads receive power supply all at once after the various types of control circuits in the wireless power transmission system are activated, so excess current flows at the time of connecting loads due to transient response. As a result, the loads cannot operate as expected.

A wireless power transmission system according to another aspect of the present disclosure includes:
a power transmitting device;
a power receiving device; and
an N number of relay devices (where N is an integer of 2 or larger) disposed between the power transmitting device and the power receiving device;
the power transmitting device including
a transmitting side inverter circuit that converts transmitting side DC power supplied from an external power source into transmitting side AC power, and
a transmitting side power transmitting antenna that wirelessly transmits the transmitting side AC power,
a first relay device, out of the N relay devices, including
a first relay side power receiving antenna that receives the transmitting side AC power,
a first relay side rectifier that converts the transmitting side AC power into first relay side DC power,
a first relay side inverter circuit that converts the first relay side DC power into first relay side AC power,
a first relay side load that is supplied at least part of the first relay side DC power by the first relay side rectifier,
a first relay side switch circuit that is disposed between the first relay side rectifier and the first relay side load, and that switches contact/non-contact state between the first relay side rectifier and the first relay side load, and
a first relay side power transmitting antenna that wirelessly transmits the first relay side AC power,
an i'th (where i=2 through N) relay device, out of the N relay devices, including
an i'th relay side power receiving antenna that receives the i−1'th relay side AC power,
an i'th relay side rectifier that converts the i−1'th relay side AC power into i'th relay side DC power, an i'th relay side inverter circuit that converts the i'th relay side DC power into i'th relay side AC power, an i'th relay side load that is supplied at least part of the i'th relay side DC power by the i'th relay side rectifier, an i'th relay side switch circuit that is disposed between the i'th relay side rectifier and i'th relay side load, and that switches contact/non-contact state between the i'th relay side rectifier and the i'th relay side load, and an i'th relay side power transmitting antenna that wirelessly transmits the i'th relay side AC power, the power receiving device including a receiving side power receiving antenna that receives the N'th relay side AC power, a receiving side rectifier that converts the N'th relay side AC power into receiving side DC power, a receiving side load that is supplied at least part of the receiving side DC power by the receiving side rectifier, and a receiving side switch circuit that is disposed between the receiving side rectifier and the receiving side load, and that switches contact/non-contact state between the receiving side rectifier and the receiving side load, wherein, in the wireless power transmission system, first, the i'th (where i=1 through N) switch circuit has the i'th (where i=1 through N) relay side rectifier and the i'th (where i=1 through N) relay side load in a non-contact state, and the receiving side switch circuit has the receiving side rectifier and the receiving side load in a non-contact state, the transmitting side AC power transmitted from the transmitting side power transmitting antenna is transmitted to the relay side power receiving antenna as the N'th AC power, sequentially via the i'th (where i=1 through N) relay device, and wherein the i'th (where i=1 through N) switch circuit connects the i'th (where i=1 through N) relay side rectifier to the i'th (where i=1 through N) relay side load at a timing Ti (where i=1 through N), and the receiving side switch circuit connects the receiving side rectifier to the receiving side load at a timing Tr, the timing Ti (where i=1 through N) and the timing Tr at least partially differing.

According to the above aspect, first, the i'th (where i=1 through N) switch circuit has the i'th (where i=1 through N) relay side rectifier and the i'th (where i=1 through N) relay side load in a non-contact state, and the receiving side switch circuit has the receiving side rectifier and the receiving side load in a non-contact state, in which state the transmitting side AC power transmitted from the transmitting side power transmitting antenna is transmitted to the receiving side power receiving antenna as the N'th AC power, sequentially via the i'th (where i=1 through N) relay device. Next, the i'th (where i=1 through N) switch circuit connects the i'th (where i=1 through N) relay side rectifier to the i'th (where i=1 through N) relay side load at a timing Ti (where i=1 through N), and the receiving side switch circuit connects the receiving side rectifier to the receiving side load at a timing Tr. The timing Ti (where i=1 through N) and the timing Tr at least partially differ here. That is to say, not all timings Ti (where i=1 through N) and the timing Tr are the same.

Accordingly, power supply is started to the loads after power has been transmitted to all of the N relay devices and the power receiving device. Also, the timing of starting power supply to the load in i'th (where i=1 through N) relay devices and the timing of starting power supply to the load in the power receiving device are staggered (at least partially).

Accordingly, the following problem of the comparative example can be solved by this aspect as well.

(1) When starting power transmission, the loads are connected immediately after various types of control circuits (e.g., microcontrollers) in the wireless power transmission system are activated, so there are cases where control circuits stop due to voltage drop. As a result, power cannot be supplied to the loads in a stable manner.

(2) All loads are connected all at once after the various types of control circuits in the wireless power transmission system are activated, so excess current flows at the time of connecting loads due to transient response. As a result, the loads cannot operate as expected.

Figure 5A:
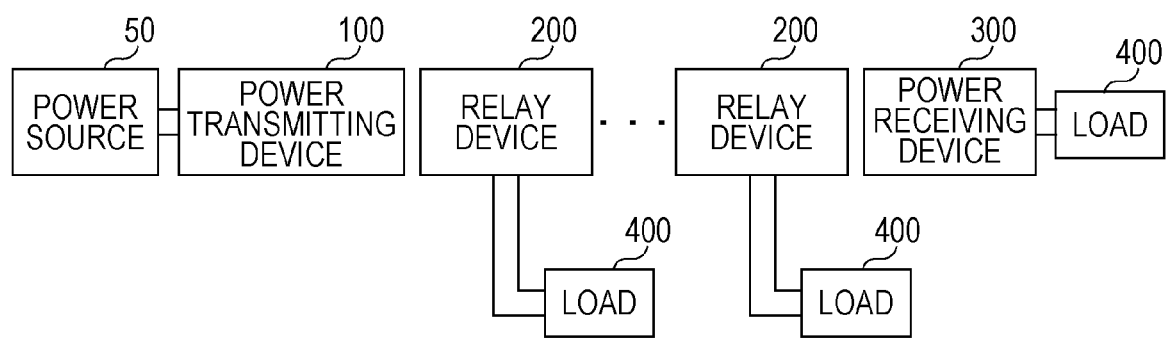
FIG. 5A is a block diagram schematic illustrating an example of a wireless power transmission system according to the present disclosure.

Now, a basic configuration of an embodiment of the present disclosure will be described. FIG. 5A is a block diagram schematically illustrating an example of the wireless power transmission system according to the present disclosure. In this system, power is transmitted wirelessly from a power transmitting device 100 connected to an external power source 50, to a power receiving device 300, via multiple relay devices 200. Each of the multiple relay devices 200 and the power receiving device 300 have a load 400 connected, and part of the received power is supplied to the load 400. Each relay device 200 supplies power to the load 400 that is connected to itself, and transmits power non-contact to the device downstream (another relay device 200 or the power receiving device 300 in proximity). Note that in the present specification, the side of a relay device of interest that is closer to the power transmitting device is referred to as "upstream" and the side that is closer to the power receiving device is referred to as "downstream".

Power transmission among devices is performed by a power transmitting antenna and a power receiving antenna. The power transmitting device 100 has a power transmitting antenna, and the power receiving device 300 has a power receiving antenna. The relay devices 200 each have both a power transmitting antenna and a power receiving antenna. Each antenna may be realized by a resonance circuit including a coil and capacitor for example, or by a circuit including a pair of electrodes. The former is used for power transmission by magnetic coupling, and latter is used for power transmission by electric coupling.

The load 400 is not restricted to being a motor, and may be any load, such as a camera or lighting device, for example. The load 400 is driven by power from the relay device 200 or power receiving device 300 to which it is connected.

Figure 5B:
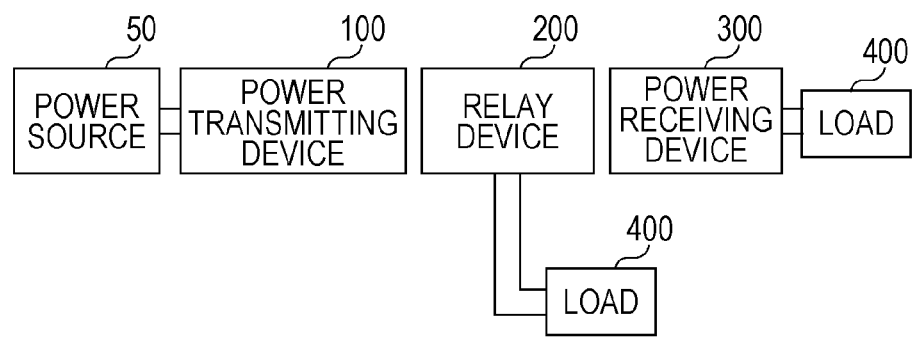
FIG. 5B is a diagram illustrating an example of a wireless power transmission system where one relay device is provided between a power transmitting device and a power receiving device.

Although the system illustrated in FIG. 5A has multiple relay devices 200, the number of relay devices 200 may be one. FIG. 5B illustrates an example of a wireless power transmission system where one relay device 200 has been placed between the power transmitting device 100 and the power receiving device 300.

According to the above configuration, power is wirelessly transmitted from the power transmitting device 100 to the power receiving device 300 via at least one relay device 200. Electric power can be supplied to each of the loads 400 without using cables to connect the external power source 50 to the multiple loads 400. Further, the control circuits in the devices cooperate to suitably adjust the timing of connecting to each of the loads 400, so operations at the time of activating can be made to be stable.

Note that while the loads 400 are illustrated as being independent components from the relay devices 200 or power receiving device 300 in FIGS. 5A and 5B, the loads 400 may be included within the relay devices 200 or power receiving device 300.

Embodiments of the present disclosure will be described below in further detail. It should be noted, however, that unnecessarily detailed description may be omitted. For example, detailed description of well-known items and redundant description of configurations which are essentially the same, may be omitted. This is to avoid unnecessary redundancy in the following description and to facilitate understanding of those skilled in the art. The present inventors have provided the attached drawings and the following description to facility sufficient understanding of the present disclosure by those skilled in the art, and it should be understood that the providing of these is not intended to restrict the subject matter laid forth in the Claims. In the following description, components which are the same or are similar are denoted by the same reference numerals.

In the present specification, expression such as "transmitting side so-and-so" for the power transmitting device, "relay side so-and-so" for the relay devices, and "receiving side so-and-so" for the power receiving device, may be used to facilitate understanding. Further, the "transmitting side", relay side", and "receiving side" of these expressions may be omitted in some cases for the sake of brevity.

First Embodiment

Figure 6:
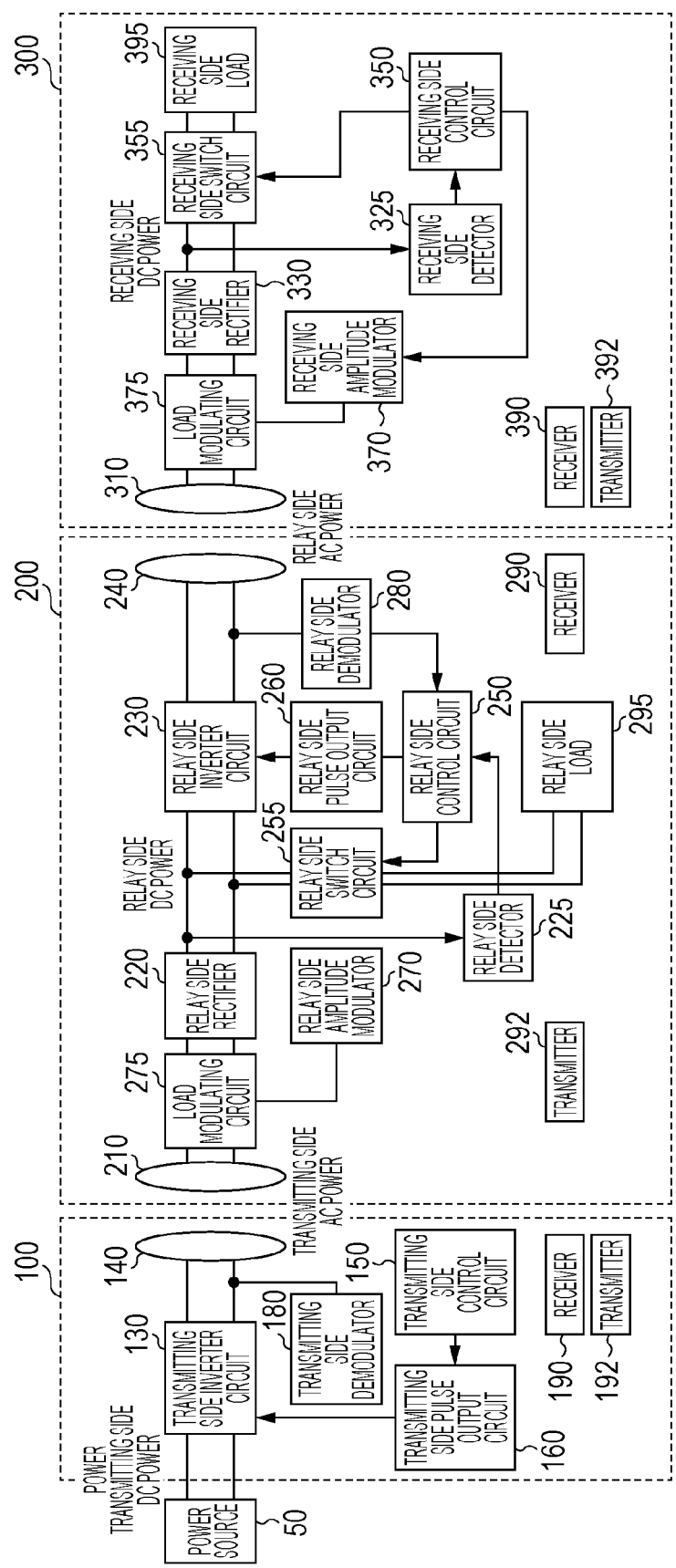
FIG. 6 is a block diagram illustrating the configuration of a wireless power transmission system according to a first embodiment of the present disclosure.

FIG. 6 is a block diagram illustrating the configuration of a wireless power transmission system according to a first embodiment of the present disclosure. The wireless power transmission system includes the power transmitting device 100, relay device 200, and power receiving device 300. The present system corresponds to the configuration in FIG. 5B, and there is one relay device 200 between the power transmitting device 100 and the power receiving device 300. In the present embodiment, power is sequentially supplied to the respective receiving side load 395 and relay side load 295 of the power receiving device 300 and relay device 200, in that order.

The power transmitting device 100 has a transmitting side inverter circuit 130 that converts DC power (transmitting side DC power) supplied from the external power source (DC power source) 50 into AC power (transmitting side AC power) and outputs, and a transmitting side power transmitting antenna 140 that transmits AC power output from the transmitting side inverter circuit 130. The power transmitting device 100 further includes a transmitting side pulse output circuit 160 that drives the transmitting side inverter circuit 130, a transmitting side control circuit 150 that controls the transmitting side pulse output circuit 160, and a transmitting side demodulator 180 that demodulates data transmitted from the relay device 200. The transmitting side demodulator 180 detects change in the amplitude of the AC voltage output from the transmitting side inverter circuit 130, thereby demodulating the data transmitted from the relay device 200. Note that instead of this amplitude modulation communication, a transmitting side receiver 190 and transmitting side transmitter 192 may be provided that perform communication by a different system.

The relay device 200 includes a relay side power receiving antenna 210 that is electromagnetically coupled with the transmitting side power transmitting antenna 140 and receives transmitted AC power (transmitting side AC power), a relay side rectifier 220 that converts the received transmitting side AC power into DC power (relay side DC power), a relay side inverter circuit 230 that converts the relay side DC power into AC power (relay side AC power), and a relay side power transmission antenna 240 that wirelessly transmits the converted relay side AC power. The relay device 200 also includes a relay side pulse output circuit 260 that drives the relay side inverter circuit 230, and a relay side control circuit 250 that controls the relay side pulse output circuit 260. The relay side control circuit 250 converts the DC power into AC power by controlling the relay side inverter circuit 230 via the relay side pulse output circuit 260.

The relay device 200 further includes a relay side load 295, a relay side switch circuit 255 disposed between the relay side rectifier 220 and the relay side load 295, and a relay side detector 225 that detects DC voltage output from the relay side rectifier 220. The relay side switch circuit 255 includes one or more switching devices, and switches the switching devices on and off in response to control signals from the relay side control circuit 250. Accordingly, the connection/non-connection of the relay side rectifier 220 and the relay side load 295 is switched. The relay side control circuit 250 generates the control signals based on a comparison result between the value of the DC voltage detected by the relay side detector 225 and the value of the requited voltage of the power receiving device 300 set beforehand, and outputs the generated control signals to the relay side switch circuit 255.

The relay device 200 includes a relay side load modulating circuit 275 and a relay side amplitude modulator 270 as components for data transmission to the power transmitting device 100. The relay device 200 further includes a relay side modulator 280 as a component for data receipt from the power receiving device 300. The relay side load modulating circuit 275 is connected between the relay side power receiving antenna 210 and the relay side rectifier 220, and changes the magnitude of the load of the relay side load modulating circuit 275 in accordance with the value of the data being transmitted. The relay side modulator 280 detects the change in amplitude of the AC voltage being applied to the relay side power transmission antenna 240, and demodulates data transmitted from the downstream power receiving device 300. An arrangement may be made using a relay side transmitter 292 and a relay side receiver 290 performing communication according to another system, instead of these components.

The power receiving device 300 includes a receiving side power receiving antenna 310 that receives the relay side AC power transmitted from the relay side power transmission antenna 240, a receiving side rectifier 320 that converts the AC power that the receiving side power receiving antenna 310 has received into DC power (receiving side DC power) and outputs this DC power, a receiving side load 395, and a receiving side switch circuit 355 disposed between the receiving side rectifier 320 and receiving side load 395. The receiving side switch circuit 355 includes one or more switching devices. The receiving side switch circuit 355 switches the switching devices on and off in response to control signals from a receiving side control circuit 350, thereby switching contact/non-contact of the receiving side rectifier 320 and the receiving side load 395. The control signals are generated based on a comparison result between the magnitude of the receiving side DC power detected by a receiving side detector 325 and the requested voltage of the power receiving device 300.

The power receiving device 300 further includes a receiving side load modulating circuit 375 connected between the receiving side power receiving antenna 310 and the receiving side rectifier 320, and a receiving side amplitude modulator 370 that controls the receiving side load modulating circuit 375 to modulate the amplitude of the AC power that the receiving side power receiving antenna 310 has received. Note that a receiving side transmitter 392 and receiving side receiver 390 may be separately provided that perform communication by a different system from amplitude modulation.

Figure 7:
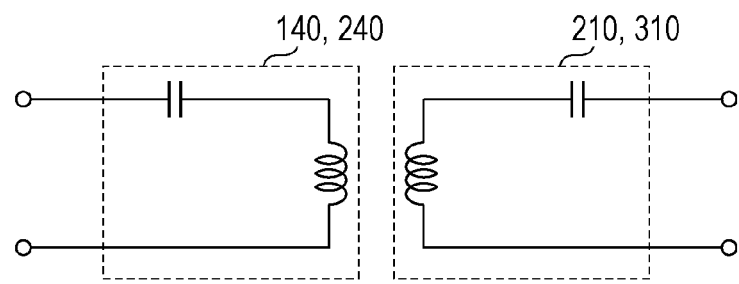
FIG. 7 is a diagram illustrating an example of an equivalent circuit of an antenna having a serial resonance circuit configuration.

The transmitting side power transmitting antenna 140, relay side power receiving antenna 210, relay side power transmission antenna 240, and receiving side power receiving antenna 310 each may be realized by a resonance circuit including a coil and capacitor, for example. FIG. 7 illustrates an example of an equivalent circuit of the transmitting side power transmitting antenna 140, relay side power receiving antenna 210, relay side power transmission antenna 240, and receiving side power receiving antenna 310, having a serial resonance circuit configuration. The example illustrated is not restrictive, and the antennas may have a parallel resonance circuit configuration. In the present specification, a coil in a power transmitting antenna may be referred to as a transmitting coil, and a coil in a power receiving antenna may be referred to as a receiving coil. The inductive coupling (i.e., magnetic coupling) between the transmitting coil and receiving coil of the power transmitting antenna and power receiving antenna enables electric power to be wirelessly transmitted. The antennas may have a configuration to wirelessly transmit electric power using electric coupling instead of magnetic coupling. In this case, the antennas may have two electrodes for transmitting and receiving, and a resonance circuit including an inductor and a capacitor. A power transmitting antenna and power receiving antenna that use electric coupling are suitably used in a case of wirelessly transmitting electric power to device that move, such as transportation robots within a factory, for example.

The power receiving device 300 may be a tip of a robot arm or a rotating portion of a surveillance camera or the like, for example. The power transmitting device 100 is a device that supplies electric power wirelessly to the relay device 200, and may be mounted to a base portion of a robot arm or a fixed portion of a surveillance camera, for example. The relay device 200 may be a portion connecting the base side portion to the tip of the robot arm, or a portion connecting the fixed portion of the surveillance camera to the rotating portion, for example.

Each load may be a device including a motor such as an actuator installed on the tip of a robot arm, or a CCD camera or lighting device or the like mounted on the rotating portion of a surveillance camera, for example. Each load is connected to the relay side rectifier 220 or receiving side rectifier 320 by the relay side switch circuit 255 or receiving side switch circuit 355, and driven by DC power.

Each rectifier may be a known rectifier circuit such as a single-phase full-wave rectifier circuit or single-phase half-wave rectifier circuit, for example. Each inverter circuit may be a full-bridge or half-bridge known inverter circuit, for example. Each pulse output circuit may be a known gate driver circuit, for example. Each control circuit may be an integrated circuit including a processor and memory, such as a microcontroller or the like for example. The later-described operations are executed by the processor executing control programs stored in memory. The transmitting side control circuit 150, relay side control circuit 250, and receiving side control circuit 350 may be part of a circuit integrated with another component.

Figure 8:
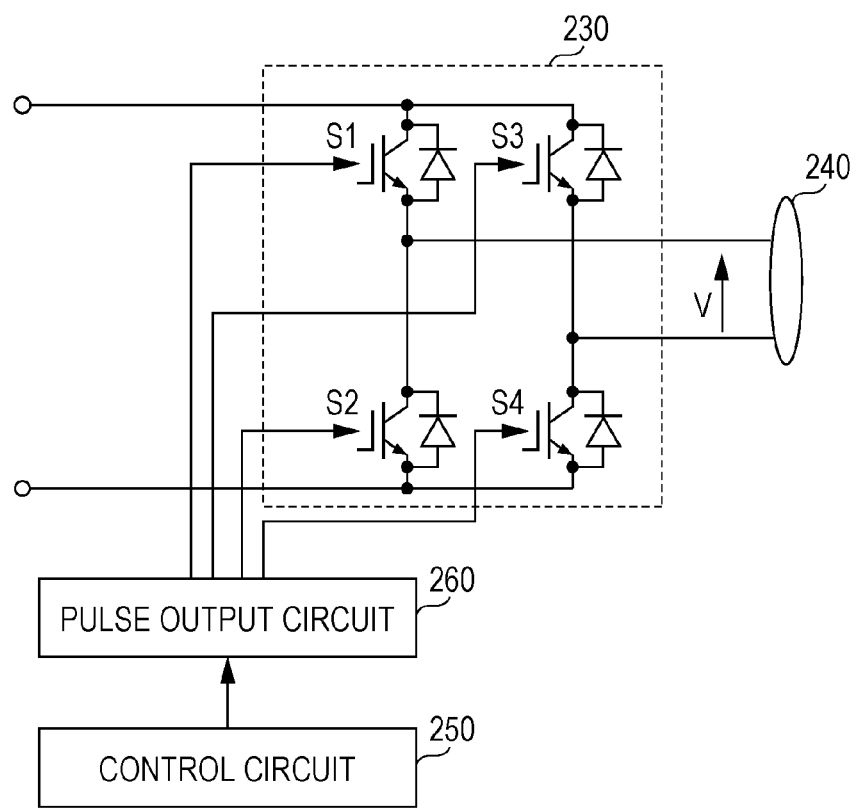
FIG. 8 is a diagram illustrating a configuration example of a relay side inverter circuit.

FIG. 8 is a diagram illustrating a configuration example of the relay side inverter circuit 230. The relay side inverter circuit 230 has multiple switching devices S1 through S4 that change between a conducting state and a non-conducting state in accordance with pulse signals supplied from the relay side pulse output circuit 260. Switching the conducting/non-conducting states of the switching devices allows the input DC power to be converted into AC power. The example in FIG. 8 illustrates a full-bridge inverter circuit including the four switching devices S1 through S4. The switching devices in this example are insulated gate bipolar transistors (IGBT), but other types of switching devices may be used, such as metal-oxide semiconductor field-effect transistors (MOSFET) or the like.

Out of the four switching devices S1 through S4 in the example illustrated in FIG. 8, the switching devices S1 and S4 (referred to as a first switching device pair) output voltage of the same polarity as the supplied DC voltage when conducting. On the other hand, the switching devices S2 and S3 (referred to as a second switching device pair) output voltage of the opposite polarity to the supplied DC voltage when conducting. The relay side pulse output circuit 260 supplies pulse signals to the gates of the four switching devices S1 through S4 in accordance with instructions from the relay side control circuit 250. At this time, amplitude control can be performed by adjusting the phase difference of two pulse signals being supplied to the first switching device pair (S1 and S4) and the second switching device pair (S2 and S3).

Figure 9:
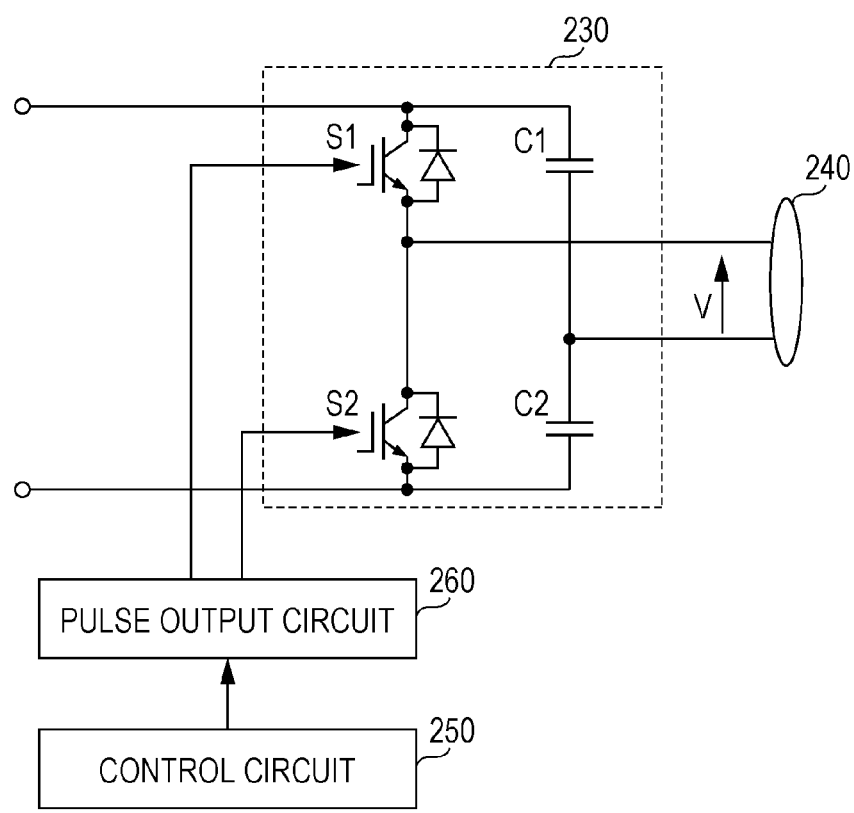
FIG. 9 is a diagram illustrating another configuration example of the relay side inverter circuit.

FIG. 9 is a diagram illustrating another configuration example of the relay side inverter circuit 230. The relay side inverter circuit 230 in this example is a half-bridge inverter circuit. In a case where a half-bridge inverter circuit is being used, the above-described phase control cannot be applied. In this case, the voltage amplitude can be controlled by controlling the duty ratio of the pulse signals input to the switching devices.

The relay side inverter circuit 230 in FIG. 9 is a half-bridge inverter circuit including two switching devices S1 and S2, and two capacitors. The two switching devices S1 and S2, and the two capacitors C1 and C2 are connected in parallel. One end of the relay side power transmission antenna 240 is connected to a point between the two switching devices S1 and S2, and the other end is connected to a point between the two capacitors C1 and C2.

The relay side control circuit 250 and relay side pulse output circuit 260 supply pulse signals to the switching devices so that the switching devices S1 and S2 go on alternatingly. Thus, the DC power is converted into AC power.

In this example, the output time ratio of the output voltage V (i.e., the proportion of time of assuming a non-zero value in one cycle) can be adjusted by adjusting the duty ratio of the pulse signals (i.e., the proportion of time of being on in one cycle). Thus, the voltage amplitude of the AC power being input to the relay side power transmission antenna 240 can be controlled. This sort of duty control can be applied to a case of using a full-bridge inverter circuit as illustrated in FIG. 8, as well. Further, although the configuration and control method of the relay side inverter circuit 230 has been exemplarily illustrated above, the same configuration and control can be applied to the transmitting side inverter circuit 130 as well.

Figure 10A:
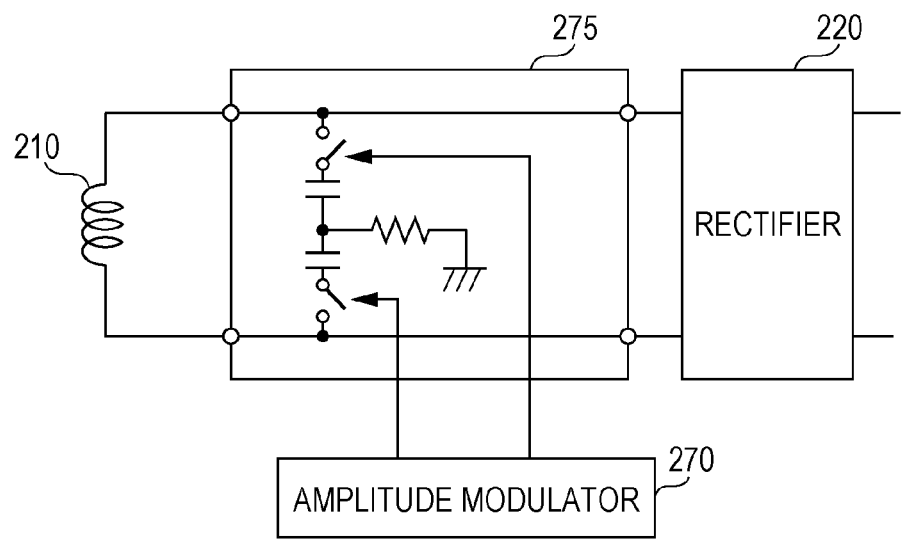
FIG. 10A is a diagram illustrating a configuration example of a relay side load modulating circuit.

FIG. 10A is a diagram illustrating a configuration example of the relay side load modulating circuit 275. The illustrated relay side load modulating circuit 275 is connected between the relay side power receiving antenna 210 and the relay side rectifier 220. The relay side load modulating circuit 275 includes two switches and two capacitors connected in parallel to the relay side power receiving antenna 210, and a resistor connected between a point between the two capacitors and a ground. The relay side load modulating circuit 275 performs load modulation by switching the open and closed states of the two switches based on control signals from the relay side amplitude modulator 270. More specifically, by switching the two switches on and off, a path where current flows other than the path toward the load 400 is opened and closed, thereby changing the magnitude of the load for the overall circuit. Accordingly, information can be transmitted to the power transmitting device 100.

Figure 10B:
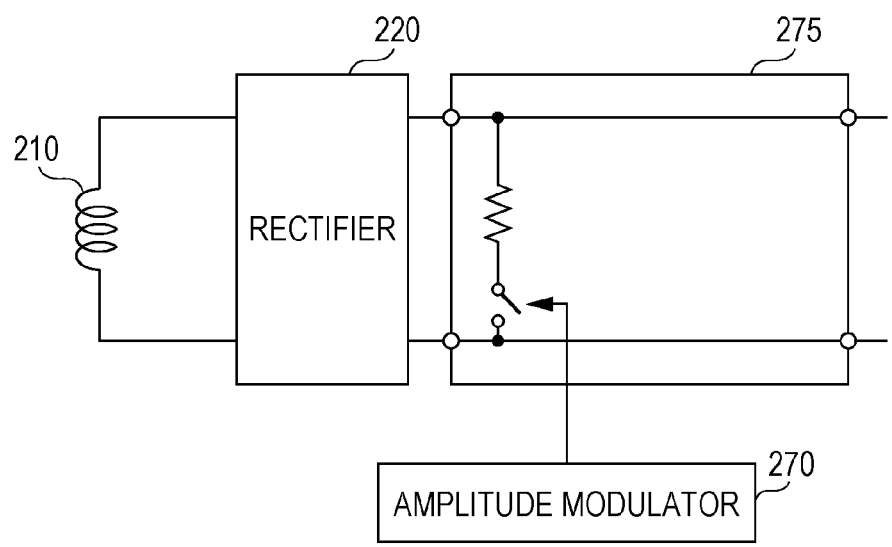
FIG. 10B is a diagram illustrating another configuration example of the relay side load modulating circuit.

Although the relay side load modulating circuit 275 is disposed upstream of the relay side rectifier 220 in the configuration example illustrated in FIG. 6, it may be provided downstream from the relay side rectifier 220. FIG. 10B is a diagram illustrating an example of the relay side load modulating circuit 275 disposed in this way. This relay side load modulating circuit 275 is connected between the relay side rectifier 220 and the load 400. The relay side load modulating circuit 275 includes a resistor and switch connected in parallel between the relay side rectifier 220 and load 400. The load of the overall power receiving device can be changed by switching the switch on and off in accordance with control signals from the relay side amplitude modulator 270.

Although FIGS. 10A and 10B illustrate a configuration example of the relay side amplitude modulator 270 and the relay side load modulating circuit 275, the receiving side amplitude modulator 370 and receiving side load modulating circuit 375 may have the same configuration as well.

According to this configuration, the wireless power transmission system according to the present embodiment can communicate data among adjacent devices while transmit power wirelessly. The type of data transmitted may be information such as the later-described notification of stability, achievement information, tip conduction completion information, and so forth. Alternatively, this may be information representing a power value or voltage value within the circuit, a control signal or signal indicating an abnormality from the connected load, or a response signal as to a command or image (video) data.

Next, the operations of the wireless power transmission system according to the present embodiment will be described. In the wireless power transmission system according to the present embodiment, power transmission starts from a state where the relay side switch circuit 255 has the relay side rectifier 220 and relay side load 295 in non-contact, and the receiving side switch circuit 355 has the receiving side rectifier 320 and receiving side load 395 in non-contact. In this state, transmitting side AC power is transmitted from the transmitting side power transmitting antenna 140 to the relay side power receiving antenna 210, and further, relay side AC power is transmitted from the relay side power transmission antenna 240 to the receiving side power receiving antenna 310.

That is to say, power is first transmitted in a state where the relay side switch circuit 255 and the receiving side switch circuit 355 are both in a non-conducting (off) state. Eventually, the voltage of the receiving side DC power reaches the requested voltage of the power receiving device 300. Now, the requested voltage of the power receiving device 300 means a predetermined voltage value set to the power receiving device beforehand. This requested voltage is set to a sufficiently high value to where it is not smaller than the driving voltage of the receiving side control circuit (e.g., microcontroller) within the power receiving device even if power is supplied to the receiving side load connected to the power receiving device.

Next, after the voltage of receiving side DC power has reached the requested voltage of the power receiving device, the relay side switch circuit 255 connects the relay side rectifier 220 to the relay side load 295 at a timing T1, and the receiving side switch circuit 355 connects the receiving side rectifier 320 to the receiving side load 395 at a timing T2 that is different from the timing T1.

In the present embodiment, the timing T1 is later than the timing T2. That is to say, the load is conductor from the back (tip side) in order. To summarize the above description, the flow of operations in the present embodiment are as described in (1) through (5) below.
(1) Relay side switch circuit 255 has relay side rectifier 220 and relay side load 295 in non-contact, and receiving side switch circuit 355 has receiving side rectifier and receiving side load in non-contact.
(2) Transmitting side AC power is transmitted from transmitting side power transmitting antenna 140 to relay side power receiving antenna 210, and relay side AC power is transmitted from relay side power transmitting antenna 240 to receiving side power receiving antenna 310.
(3) Voltage of receiving side DC power reaches requested voltage of power receiving device 300.
(4) Receiving side switch circuit 355 connects receiving side rectifier 320 to receiving side load 395.
(5) Relay side switch circuit 255 connects relay side rectifier 220 to relay side load 295.

After the (4) above, the power receiving device 300 may transmit information to the effect that the receiving side DC voltage has stabilized, i.e., that the temporal change of the receiving side DC power has come to be within a predetermined range (referred to as "notification of stability" in the present specification) to the relay device 200. The relay side control circuit 250 can switch the relay side switch circuit 255 from off to on, with the reception of the notification of stability as a trigger. This transmission and receipt of notification of stability may be performed by the receiving side amplitude modulator 370 and receiving side load modulating circuit 375, and the relay side modulator 280. Alternatively, this may be performed by the receiving side transmitter 392 in the power receiving device 300 and the relay side receiver 290 in the relay device 200.

Next, a more specific example of operations in the present embodiment will be described. The configuration illustrated in FIG. 11A will be assumed as an example in the following description.

Figure 11A:
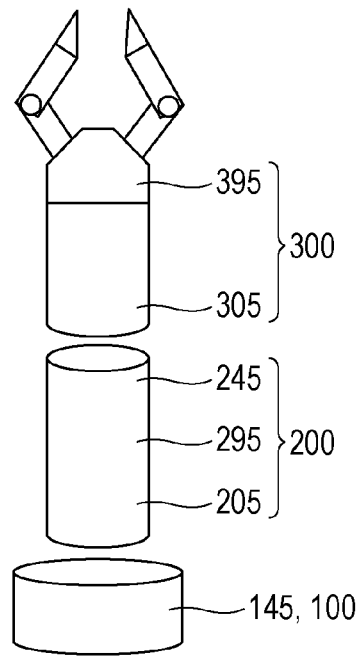
FIG. 11A is a diagram schematically illustrating a configuration where the wireless power transmission system according to the first embodiment has been applied to a robot arm.

FIG. 11A is a diagram schematically illustrating a configuration where the wireless power transmission system according to the present embodiment has been applied to a robot arm. The robot arm has the power transmitting device 100 at the base portion, the power receiving device 300 at the tip portion, and the relay device 200 in between. In each device, a group of circuit components relating to power transmission will be referred to here as a power transmitting circuit, and a group of circuit components relating to power reception will be referred to as a power receiving circuit. That is to say, the a power transmitting circuit includes components relating to the power transmission, such as an inverter circuit, power transmitting antenna, and so forth. On the other hand, a power receiving circuit includes components relating to power receiving, such as a power receiving antenna and a rectifier and so forth. The power transmitting device 100 illustrated in FIG. 11A includes a transmitting side power transmitting circuit 145. The relay device 200 includes a relay side power receiving circuit 205, the relay side load 295, and a relay side power transmitting circuit 245. The power receiving device 300 includes a receiving side power receiving circuit 305 and the receiving side load 395.

Figure 11B:
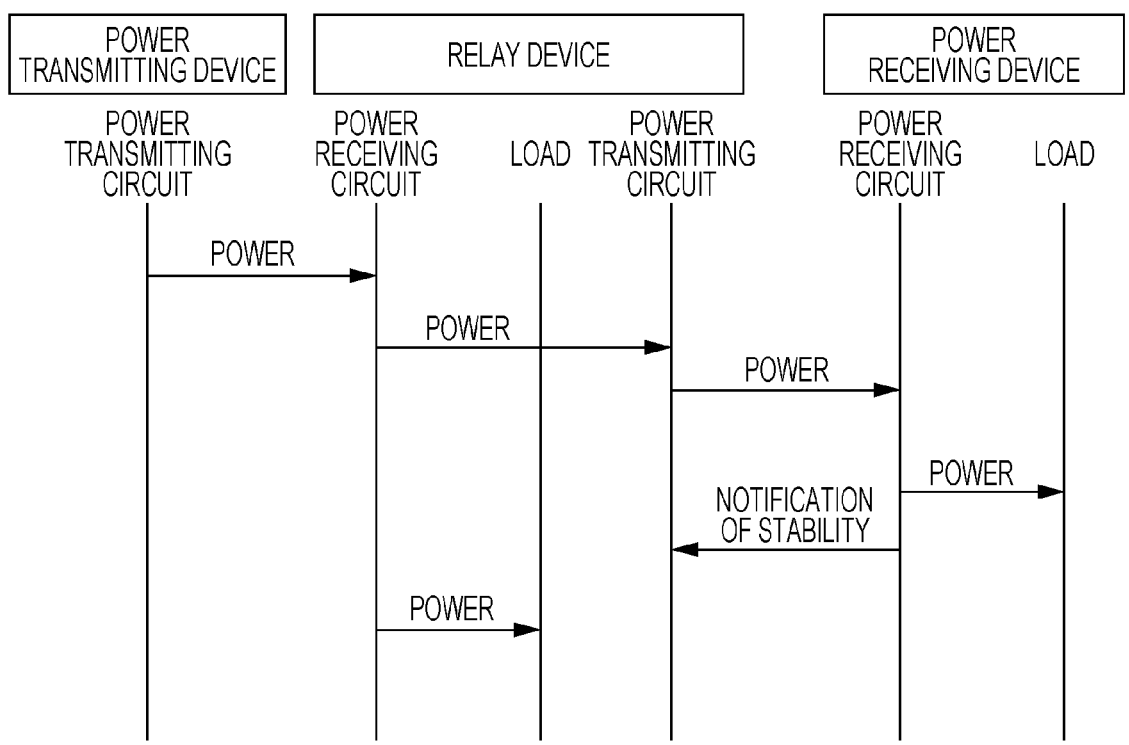
FIG. 11B is a sequence diagram illustrating an example of operations when activating, in the first embodiment.

FIG. 11B is a sequence diagram illustrating an example of operations at the time of activation in the present embodiment. FIG. 11B illustrates the order of power supply (activation) to each part, and the timing of the notification of stability after supplying power to the load. After turning the power source on, when the voltage supplied to the control circuits exceeds a predetermined voltage (the above-described control system driving voltage), the control circuits are activated, the inverter circuits are driven, and power transmission is started. Note that the relay side control circuit 250 and receiving side control circuit 350 are connected to the relay side rectifier 220 and receiving side rectifier 320 respectively, and driven by the DC power output from the relay side rectifier 220 and receiving side rectifier 320. The transmitting side control circuit 150 is driven by the DC power output from the external power source 50. The power is transmitted in the order of transmitting side power transmitting circuit 145, relay side power receiving circuit 205, relay side power transmitting circuit 245, and receiving side power receiving circuit 305. During this time, the relay side switch circuit 255 and the receiving side switch circuit 355 are kept in a non-contact (off) state. After the receiving side power receiving circuit 305 receives the power, the receiving side control circuit 350 determines whether or not the voltage value of the receiving side DC power detected by the receiving side detector 325 has exceeded a predetermined threshold (the requested voltage of the power receiving device 300). In a case where determination is made that the voltage value of the receiving side DC power has exceeded the predetermined threshold, the receiving side control circuit 350 sends a control signal to the receiving side switch circuit 355 and switches on. Accordingly, power is supplied to the receiving side load 395. Thereafter, upon having detected that the temporal change of the voltage of the receiving side DC power has stabilized within the predetermined range, the receiving side control circuit 350 transmits a notification of stability to the relay device 200. This notification of stability is transmitted by the receiving side control circuit 350 instructing the receiving side amplitude modulator 370 to transmit data indicating the notification of stability. The relay side control circuit 250 reads (receives) the transmitted notification of stability, based on the change in amplitude of the voltages detected by the relay side modulator 280. After receiving the notification of stability, the relay side control circuit 250 transmits a control signal to the relay side switch circuit 255, and switches to on. Accordingly, power is supplied to the relay side load 295.

Thus, in the present embodiment, after the voltage of the receiving side DC power reaches the requested voltage of the power receiving device 300, power is supplied to the receiving side load 395 and relay side load 295 in that order. Accordingly, the sudden drop in voltage that occurs when power is supplied to the relay side load 295 and receiving side load 395 at the same time can be suppressed. As a result, operations of the control system (relay side control circuit 250, receiving side control circuit 350, etc.) stopping due to sudden voltage drop can be avoided.

Although the number of relay devices 200 is one in the present embodiment, multiple relay devices 200 may be situated between the power transmitting device 100 and the power receiving device 300. An example of such a wireless power transmission system will be described below.

Figure 12:
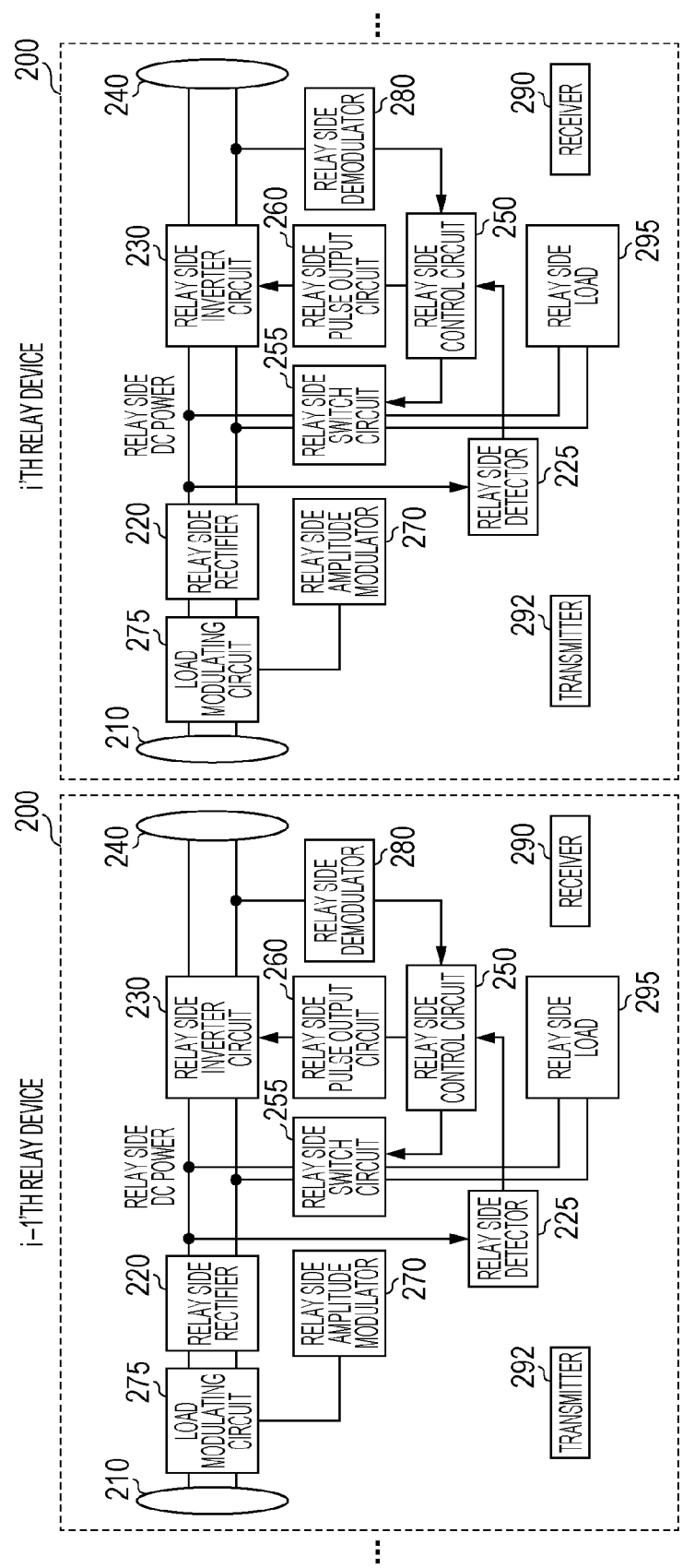
FIG. 12 is a diagram illustrating an example of a wireless power transmission system having multiple relay devices.

FIG. 12 is a diagram illustrating an example of a wireless power transmission system having multiple relay devices 200. This wireless power transmission system has the power transmitting device 100 (omitted from illustration), the power receiving device 300 (omitted from illustration), and N (where N is an integer of 2 or larger) relay devices 200 disposed between the power transmitting device 100 and the power receiving device 300, in order from the first that is the closest to the power transmitting device 100, to the N'th. In FIG. 12, the i−1'th (where i=2 through N) relay device and the i'th relay device are exemplarily illustrated out of the N relay devices. The configuration of each of the relay devices 200 is the same as the configuration of the relay device 200 illustrated in FIG. 6. The configurations of the power transmitting device 100 and power receiving device 300 not illustrated in FIG. 12 are the same as the configurations of the power transmitting device 100 and power receiving device 300 illustrated in FIG. 6.

In the wireless power transmission system in FIG. 12, first, in a state where the i'th (where i=1 through N) relay side switch circuit 255 has the i'th (where i=1 through N) relay side rectifier 220 and i'th (where i=1 through N) relay side load 295 in non-contact, and the receiving side switch circuit 355 has the receiving side rectifier 320 and receiving side load 395 in noncontact, the transmitting side AC power transmitted from the transmitting side power transmitting antenna 140 is transmitted to the receiving side power receiving antenna 310 as the N'th AC current, sequentially via the i'th (where i=1 through N) relay device. Next, the i'th (where i=1 through N) switch circuit brings the i'th (where i=1 through N) relay side rectifier 220 and i'th (where i=1 through N) relay side load 295 into contact at a timing Ti (where i=1 through N), and the receiving side switching circuit brings the receiving side rectifier 320 and receiving side load 395 into contact at timing Tr. Now, at least part of the timing Ti (where i=1 through N) and timing Tr differ. An example is described in the present embodiment in particular where power is supplied to the loads with the timing staggered in order from the back (from the power receiving device 300 side). That is to say, a case where $Tr < T_N < T_{N-1} < \ldots < T1$ will be described.

The wireless power transmission system illustrated in FIG. 12 performs the following operations, for example.
(1) Power transmission starts in state where relay side rectifier 220 and relay side load 295 of the relay device 200 are in non-contact (off) and receiving side rectifier 320 and receiving side load 395 are in non-contact (off).
(2) After the voltage of the receiving side DC power reaches the requested voltage of the power receiving device 300, the power receiving device 300 supplies receiving side DC voltage to the receiving side load 395.
(3) After the receiving side DC voltage of the power receiving device 300 has stabilized, a "notification of stability" is transmitted from the power receiving device 300 to the N'th relay device, and power is supplied to the N'th relay side load.
(4) After the N'th relay side DC voltage has stabilized, a "notification of stability" is transmitted from the N'th relay device to the N−1'th relay device, and power is supplied to the N−1'th relay side load.
(5) Thereafter, operations the same as in (4) are repeated until power is supplied to the first relay side load, while decrement the relay device No.

Figure 13A:
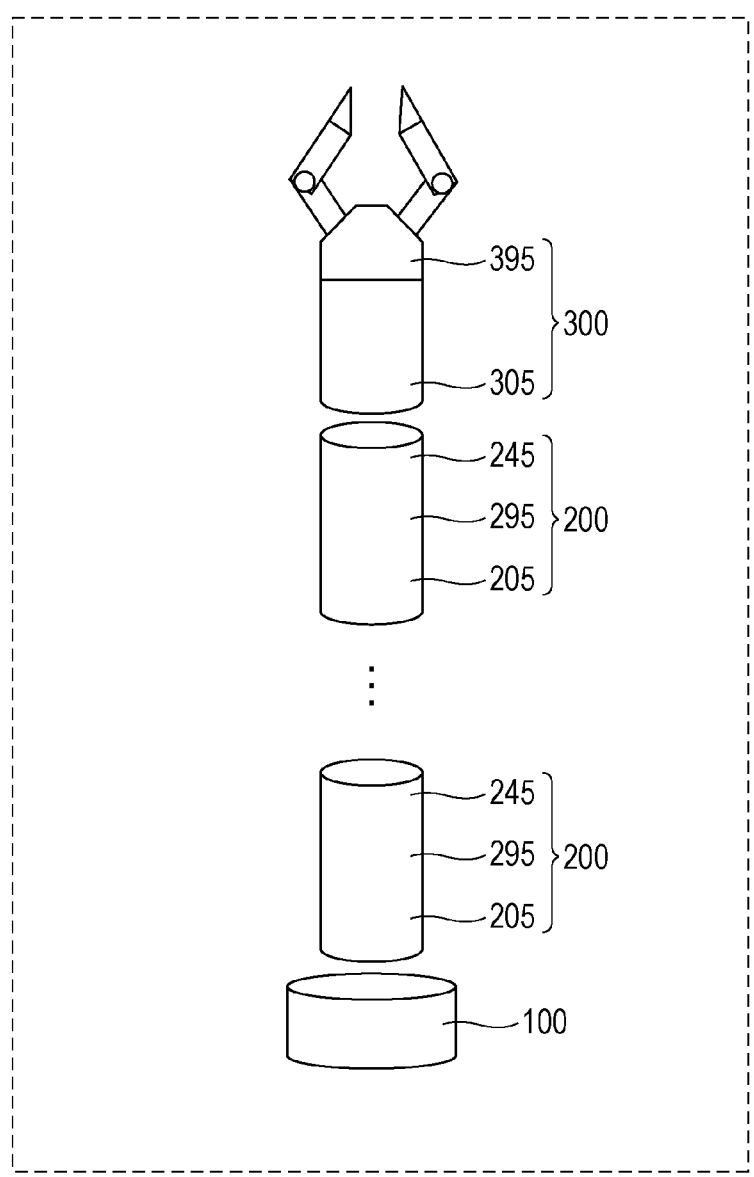
FIG. 13A is a diagram schematically illustrating the configuration in a case where the wireless power transmission system in FIG. 12 has been applied to a robot arm.

Next, a more specific example of the operations of the present embodiment will be described. A configuration of a robot arm illustrated in FIG. 13A will be assumed here. This robot arm is the same as the configuration illustrate in FIG. 11A, except for the point that there are multiple relay devices 200.

FIG. 13B is a sequence diagram illustrating an example of operations of activation in this example. FIG. 13B illustrates the order of power supply (activation) to each part, and the timing of the notification of stability after supplying power to the load. After turning the power source on, when the voltage supplied to the control circuits exceeds a predetermined voltage (the above-described control system driving voltage), the control circuits are activated, the inverter circuits are driven, and power transmission is started. The power is transmitted in the order of power transmitting device 100, first relay device, . . . , N'th relay device, and power receiving device 300. During this time, the relay side switch circuit 255 of each relay device 200 and the receiving side switch circuit 355 are kept in a non-contact (off) state. After the receiving side power receiving circuit 305 receives the power, the receiving side control circuit 350 determines whether or not the voltage value of the receiving side DC power detected by the receiving side detector 325 has exceeded a predetermined threshold (the requested voltage of the power receiving device 300). In a case where determination is made that the voltage value of the receiving side DC power has exceeded the predetermined threshold, the receiving side control circuit 350 sends a control signal to the receiving side switch circuit 355 and switches on. Accordingly, power is supplied to the receiving side load 395. Thereafter, upon having detected that the temporal change of the voltage of the receiving side DC power has stabilized within the predetermined range, the receiving side control circuit 350 transmits a notification of stability to the N'th relay device 200. This notification of stability is transmitted by the receiving side control circuit 350 instructing the receiving side amplitude modulator 370 to transmit data indicating the notification of stability. The N'th relay side control circuit 250 reads (receives) the transmitted notification of stability, based on the change in amplitude of the voltages detected by the N'th relay side modulator 280. After receiving the notification of stability, the N'th relay side control circuit 250 transmits a control signal to the N'th relay side switch circuit 255, and switches to on. Accordingly, power is supplied to the N'th relay side load 295. Thereafter, upon having detected that the temporal change of the voltage of the relay side DC voltage has stabilized within the predetermined range, the N'th relay side control circuit 250 transmits a notification of stability to the N−1'th relay device 200. This operation is repeatedly performed in order from the N−1'th relay device 200 to the first relay device 200.

To summarize, the wireless power transmission system according to the present embodiment performs the following processing.

(1) Just the wireless power transmission system without the load is activated first. Upon each relay device 200 receiving power, power is immediately supplied to the power receiving device 300 side (tip side).

(2) Once the control system is activated as far as the tip side (power receiving device 300), loads are sequentially connected from the tip side.

(3) After connecting the relay side loads 295 to the relay devices 200 stand by until voltage stabilizes, and once stabilized, notification is made upstream. Note that this standby time may be a predetermined amount of time.

(4) (3) is repeated until the load at the root (the first relay device) is connected.

The operations of the present embodiment are advantageous in that it can be realized by one-way communication from the power receiving device 300 toward the power transmitting device 100 (e.g., the above-described load modulation communication).

Wireless power transmission systems are vulnerable to sudden current draw due to overloading or the like, as described above, but restricting the number of loads connected at the same time to a certain number in the present embodiment suppresses transient response when activating.

Figure 14:
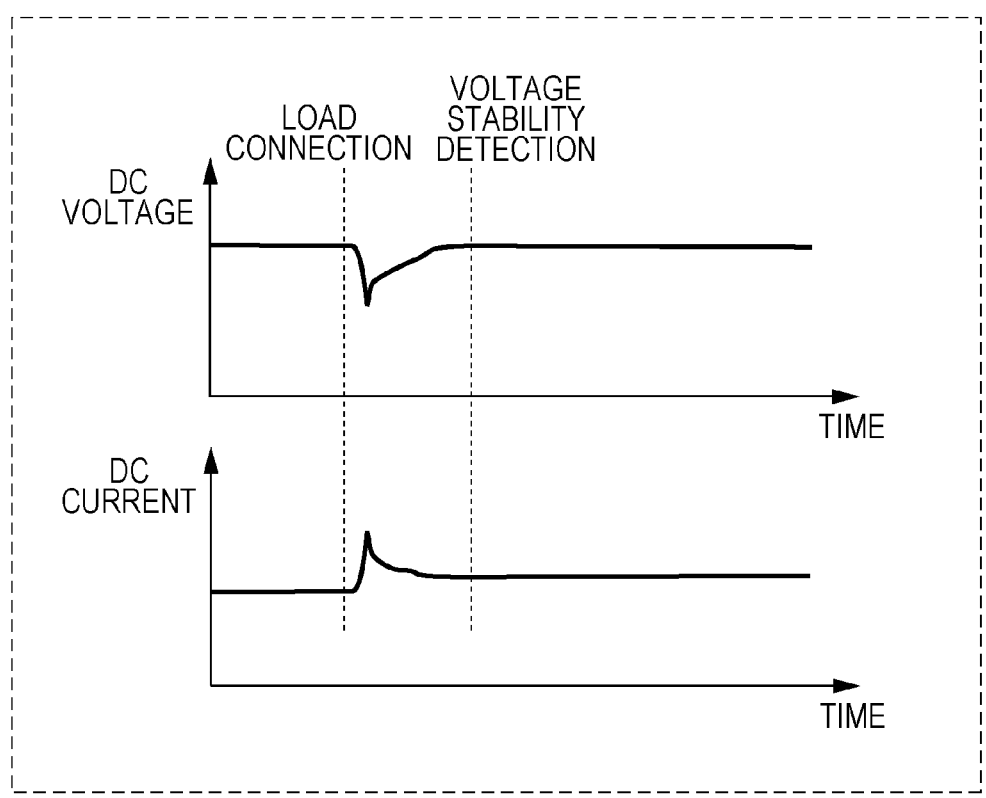
FIG. 14 is a diagram illustrating a phenomenon where DC voltage drops after connecting a load, and a phenomenon where DC current increases at the time of connecting a load (current draw)

FIG. 14 illustrates a phenomenon where DC voltage drops after load connection, and a phenomenon where DC current increases (current draw) at the time of load connection. Connecting to a load causes the voltage drop and current increase such as illustrated. Accordingly, the relay side control circuit 250 and receiving side control circuit 350 according to the present embodiment make determination of stability when the voltage returns to the predetermined value after having dropped, and issue a notification of stability. An arrangement may be made where DC current is detected instead of DC voltage, and determination of stable power supply may be made when the DC current returns to the original value after having increased.

According to the present embodiment, power supply to the loads such as motors and the like is started after conduction is made to the tip, so in a case where there is an abnormality somewhere in the power transmission portion excluding the loads (called power supply system), activation of the power supply system can be stopped without supplying to the loads.

Figure 15:
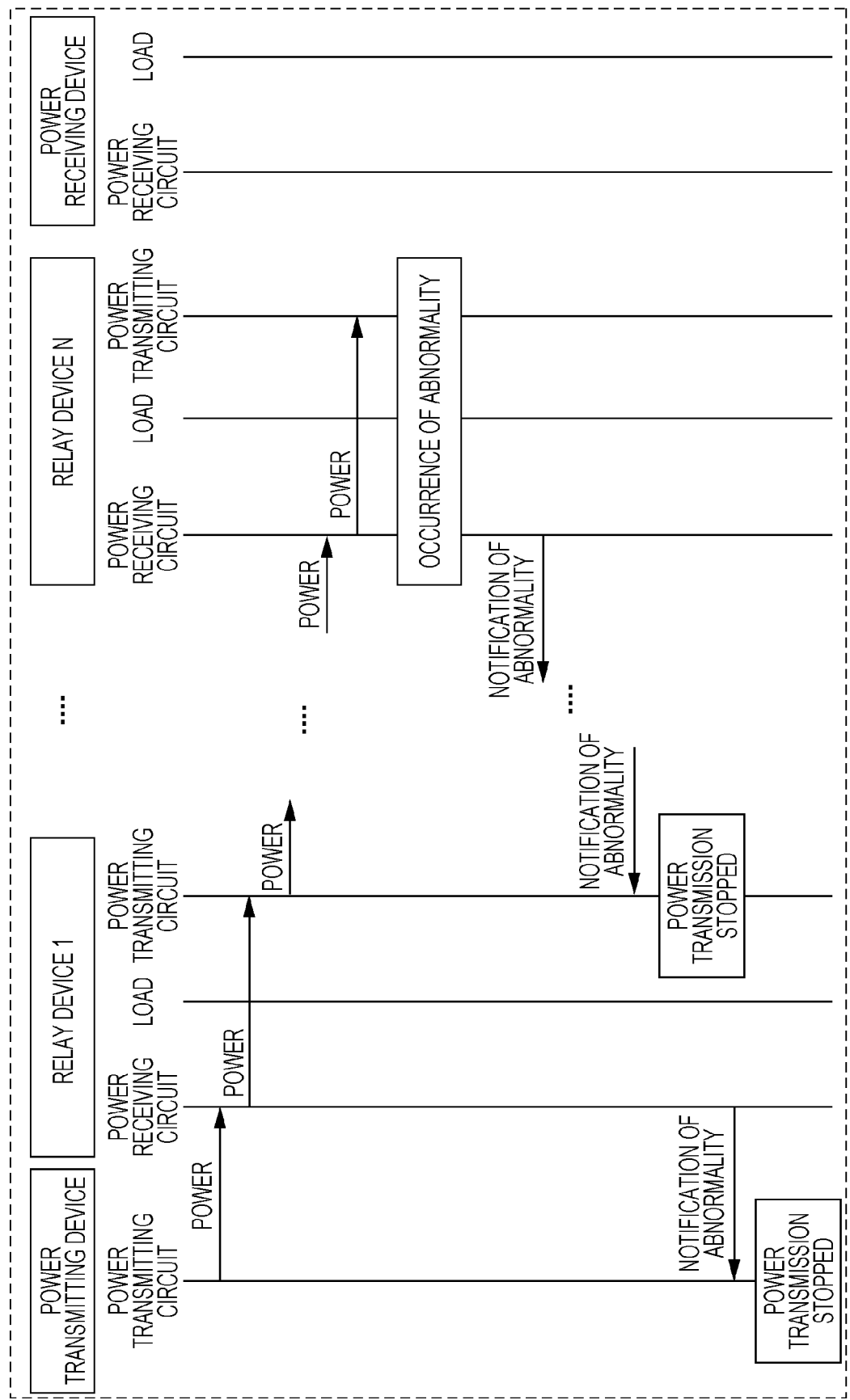
FIG. 15 is a sequence diagram illustrating an example of operations when an abnormality occurs.

FIG. 15 is a sequence diagram illustrating an example of operations when such an abnormality has occurred. Although a case where there are multiple relay devices 200 is assumed here, the same operations can be applied in a case where the number of relay devices 200 is one.

In a case where an abnormality has occurred during activation of the relay side control circuit 250 in the N'th relay device, a notification indicating an abnormality (called an abnormality notification) may be transmitted to the relay device 200 upstream. The relay devices can sequentially transmit the abnormality notification to the power transmitting device 100, and the power transmitting device 100 can stop the activation sequence upon reception thereof. In a case where the activation sequence has proceeded to the power receiving device 300 and conduction to the loads has been performed, but the voltage remains unstable after load connection, the same abnormality notification may be performed to stop power transmission.

Second Embodiment

The following is description of a second embodiment. The present embodiment differs form the first embodiment with regard to the point that power is supplied to the loads in order from the closest to the power transmitting device 100. The physical configuration in the present embodiment is the same as the configuration of the first embodiment (FIGS. 6, 12, etc.).

First, the operations in a case where the number of relay devices 200 is one will be described. The configuration in FIGS. 6 and 11A will be assumed here. The following operations are performed in the wireless power transmission system according to the present embodiment.

(1) Power transmission is started in state where relay side rectifier 220 and relay side load 295 are non-contact (off), and the receiving side rectifier 320 and receiving side load 395 are non-contact (off).

(2) After voltage of receiving side DC power reaches requested voltage of the power receiving device 300, first information (achievement information) is transmitted from the power receiving device 300 to the relay device 200.
(3) The relay side control circuit 250 supplies relay side DC power to the relay side load 295 by controlling the relay side switch circuit 255.
(4) After the voltage of the relay side DC power of the relay device 200 stabilizes, information (notification of stability) indicating stability is transmitted from the relay device 200 to the power receiving device 300.
(5) The receiving side control circuit 350 controls the receiving side switch circuit 355 to supply the receiving side DC power to the receiving side load 395.

In the present embodiment, bidirectional communication is necessary, so both the relay device 200 and power receiving device 300 need to have transmitting and receiving functions. The transmitters 292 and 392, and receivers 290 and 390 illustrated in FIG. 6, for example, may be used for this communication. The communication method is not restricted to any particular method, and may be any method. This is not restricted to the amplitude modulation method, and may be a wireless method such as wireless LAN or Zigbee or the like.

Figure 16:
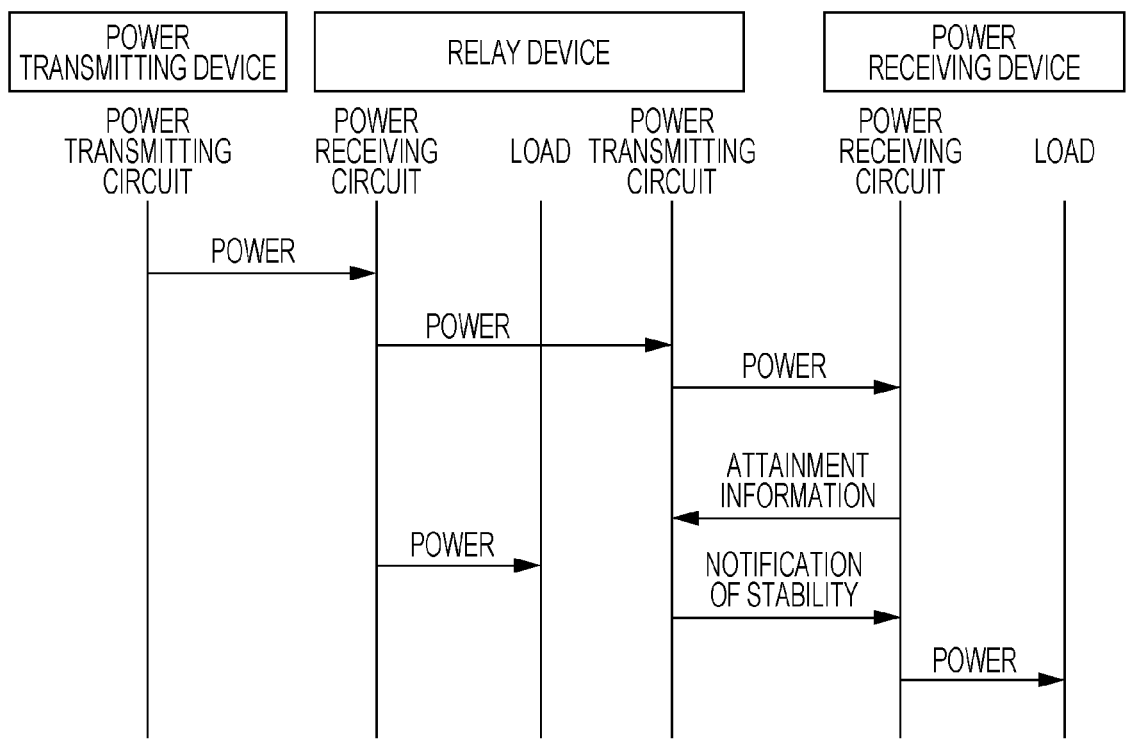
FIG. 16 is a sequence diagram illustrating an example of operations when activating according to a second embodiment.

FIG. 16 is a sequence diagram illustrating an example of operations at the time of activation in the present embodiment. FIG. 16 illustrates the order of power supply (activation) to each part, and the timing of the notification of stability after supplying power to the load. After turning the power source on, when the voltage supplied to the control circuits exceeds a predetermined voltage (the above-described control system driving voltage), the control circuits are activated, the inverter circuits are driven, and power transmission is started. The power is transmitted in the order of transmitting side power transmitting circuit 145, relay side power receiving circuit 205, relay side power transmitting circuit 245, and receiving side power receiving circuit 305. During this time, the relay side switch circuit 255 and the receiving side switch circuit 355 are kept in a non-contact (off) state. After the receiving side power receiving circuit 305 receives the power, the receiving side control circuit 350 determines whether or not the voltage value of the receiving side DC power detected by the receiving side detector 325 has exceeded a predetermined threshold (the requested voltage of the power receiving device 300). In a case where determination is made that the voltage value of the receiving side DC power has exceeded the predetermined threshold, the receiving side control circuit 350 transmits achievement information to the relay device 200. The achievement information is transmitted by the receiving side control circuit 350 instructing the receiving side amplitude modulator 370 to transmit the achievement information. The relay side control circuit 250 reads the transmitted achievement information, based on the change in amplitude of the voltages detected by the relay side modulator 280. After receiving the achievement information, the relay side control circuit 250 transmits a control signal to the relay side switch circuit 255, and switches to on. Accordingly, power is supplied to the relay side load 295. Thereafter, upon having detected that the temporal change of the voltage of the receiving side DC voltage has stabilized within the predetermined range, the relay side control circuit 250 transmits a notification of stability to the power receiving device 300. This notification of stability is transmitted by the relay side control circuit 250 instructing the relay side transmitter 292 to transmit data indicating the notification of stability. Upon the receiving side receiver 390 receiving the notification of stability from the relay device 200, the receiving side control circuit 350 transmits a control signal to the receiving side switch circuit 355, and switches to on. Accordingly, power is supplied to the receiving side load 395.

The above operations can be applied in the same way in a case where the number of relay devices 200 is multiple. The following is a description of an example of operations in a case where the number of relay devices 200 is multiple. A configuration is assumed here illustrated in FIGS. 12 and 13A, the same as in the first embodiment.

Figure 17:
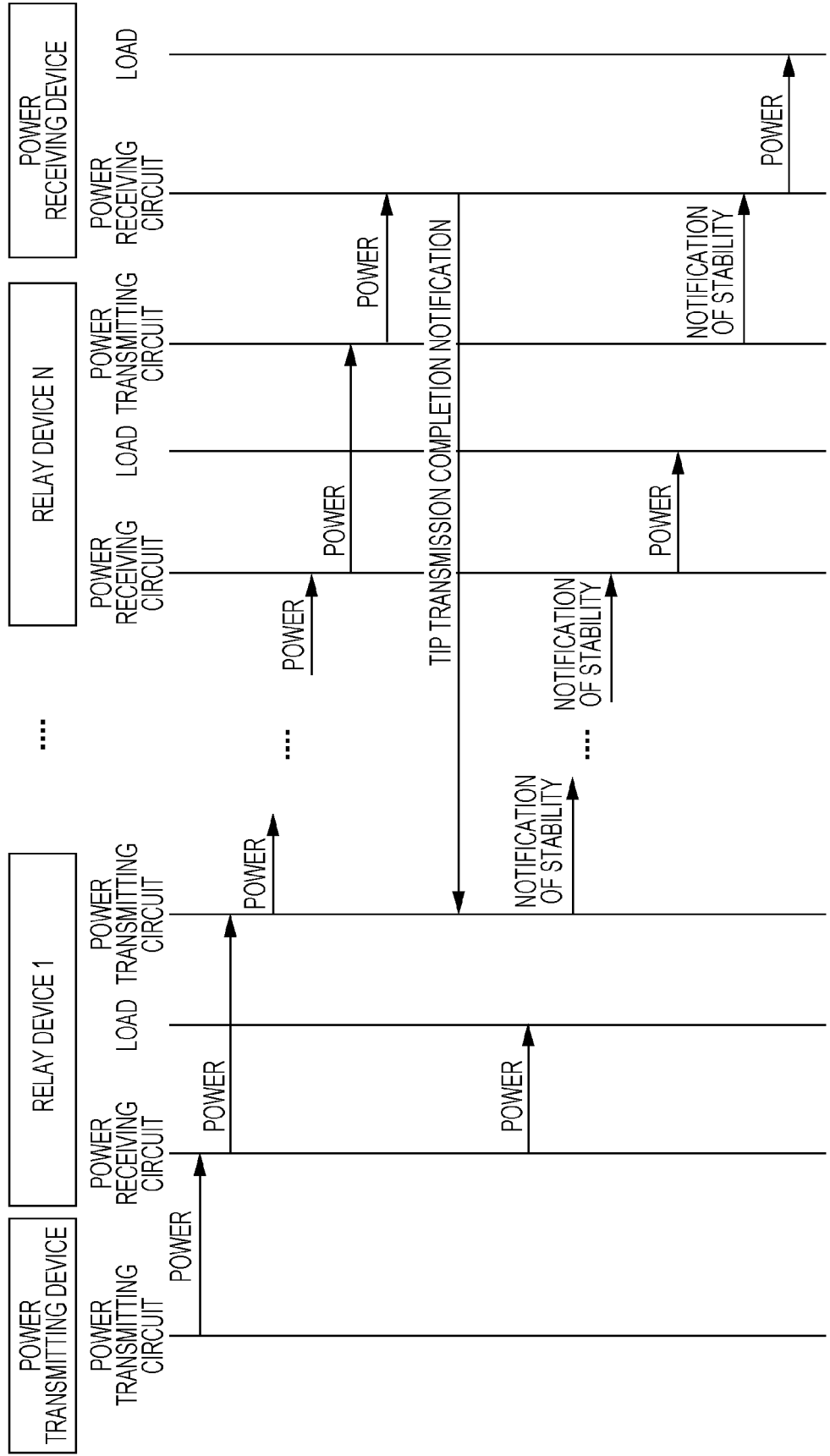
FIG. 17 is a sequence diagram illustrating an example of operations when activating, in a case where the number of relay devices is multiple in the second embodiment.

FIG. 17 is a sequence diagram illustrating an example of operations of activation in this example. First, in this example, power is transmitted from the power transmitting device 100 through the N relay devices 200 and to the power receiving device 300 in a state with all switch circuits off. The receiving side control circuit 350 determines whether or not the voltage value of the receiving side DC power detected by the receiving side detector 325 has exceeded a predetermined threshold (the aforementioned requested voltage of the power receiving device 300). In a case where determination is made that the voltage value of the receiving side DC power has exceeded the predetermined threshold, the receiving side control circuit 350 transmits first information to that effect (called tip conduction completion notification) to the first relay device. The tip conduction completion notification may be transmitted by the receiving side control circuit 350 instructing the receiving side transmitter 392 to transmit the tip conduction completion notification to the relay side receiver 290 in the first relay device. Alternatively, the receiving side amplitude modulator 370 and the relay side amplitude modulator 270 in each relay device 200 may be used for sequential transmission. When the first relay device receives the tip conduction completion notification, the first relay side control circuit 250 transmits a control signal to the first relay side switch circuit 255, and turns on. Accordingly, power is supplied to the relay-side load 295. Thereafter, upon having detected that the temporal change of the voltage of the receiving side DC voltage has stabilized within the predetermined range, the first relay side control circuit 250 transmits a notification of stability to the second relay device. The second relay side control circuit 250 receives the notification of stability, and switches the second relay side switch circuit 255 to on. Upon having detected that the temporal change of the voltage of the receiving side DC voltage has stabilized within the predetermined range, the second relay side control circuit 250 transmits a notification of stability to the third relay device. The same turning the switch circuit on (i.e., connecting to the load) and transmission of notification of stability is continued in order to the N'th relay device, and finally, power is supplied to the load of the power receiving device 300.

In this embodiment as well, power supply to the loads is performed after conduction to the power receiving device 300 is completed, so transient response is suppressed, and activation can be stabilized.

Third Embodiment

Next, a third embodiment of the present disclosure will be described. The present embodiment differs from the first and second embodiments in that the power transmitting device 100 controls the relay device 200 side and power receiving device 300. This operation is suitable for a form where the transmitting side control circuit 150 centrally manages the state of operation of each load. The power transmitting device 100 may be part of a power source control device including the external power source 50. Such a power source control device can centrally manage the state of multiple loads, and perform individual control.

The operations of an embodiment having a configuration where the number of relay devices 200 is one, as illustrated in FIG. 6, will be described. In summary, the wireless power transmission system according to the present embodiment performs the following operations.

(1) The receiving side control circuit 350 transmits a notification to the transmitting side control circuit 150, to the effect that the voltage of the receiving side SC power has reached the requested voltage (tip conduction completion notification) of the power receiving device 300.

(2) After having received the tip conduction completion notification from the receiving side control circuit 350, the transmitting side control circuit 150 causes the receiving side rectifier 320 and receiving side load 395 to connect to the receiving side control circuit 350 at a timing T2 that is different from the timing T1 of connecting the relay side rectifier 220 and relay side load 295 to the relay side control circuit 250.

Figure 18:
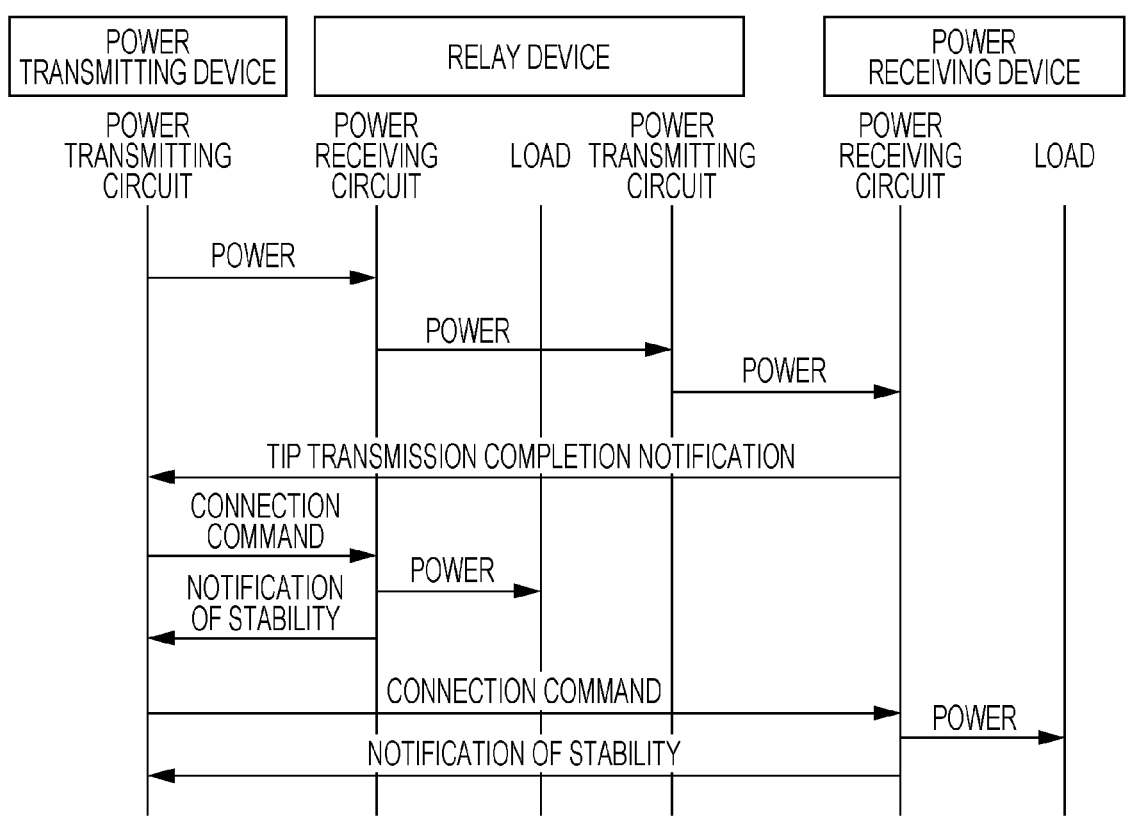
FIG. 18 is a sequence diagram illustrating an example of operations in a third embodiment.

FIG. 18 is a sequence diagram illustrating an example of operations in the present embodiment. As illustrated in FIG. 18, power is transmitted to the power receiving device 300 in a state where all switch circuits are off. Upon the received power stabilizing, the receiving side control circuit 350 transmits the tip condition completion notification to the power transmitting device 100. The transmitting side control circuit 150 transmits information instructing connection to the relay device 200 (connection command) after having received the tip conduction completion notification. The relay side control circuit 250 receives this connection command, turns the relay side switch circuit 255 on, and starts power supply to the relay side load 295. This is followed by standby until the relay side DC power stabilizes, and after stabilization, the relay side control circuit 250 transmits the notification of stability to the power transmitting device 100. Upon receiving the notification of stability, the transmitting side control circuit 150 transmits a connection command to the power receiving device 300. The receiving side control circuit 350 having received the connection command turns the receiving side switch circuit 355 on, and starts supply of power to the receiving side load 395. The receiving side control circuit 350 stands by until the receiving side DC power stabilizes, and after stabilization transmits a notification of stability to the power transmitting device 100. Any method may be used to exchange the various types of information in the above operations.

Although FIG. 18 illustrates the relay side load 295 of the relay device 200 being supplied with power first, Power may be supplied to the receiving side load 395 of the power receiving device 300 first. The transmitting side control circuit 150 of the power transmitting device 100 may optionally determine any timing for power supply.

Figure 19:
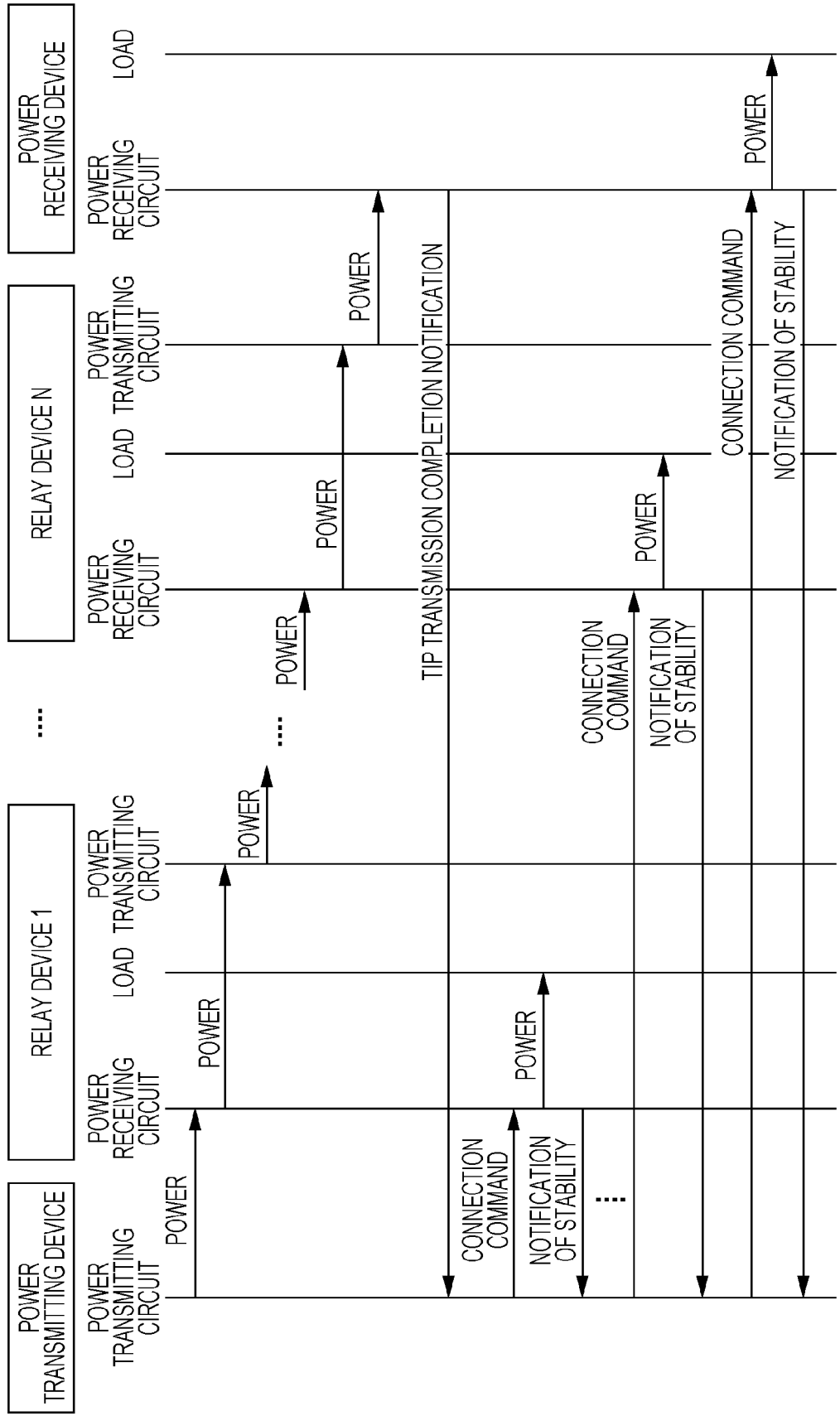
FIG. 19 is a sequence diagram illustrating an example of operations at the time of activating in a case where the number of relay devices is multiple in the third embodiment.

FIG. 19 is a diagram illustrating en example of an activation sequence in a configuration where the number of relay devices 200 is multiple (FIG. 12). In the same way, in this example the receiving side control circuit 350 transmits a tip conduction completion notification to the transmitting side control circuit 150 upon conduction to the power receiving device 300 being competed. Upon receiving the tip conduction completion notification, the transmitting side control circuit 150 gives a connection command to one of the relay devices 200 or the power receiving device 300 to which the load has not yet been connected. The relay device 200 or the power receiving device 300 which has received the connection command turns the switch circuit on, and connects to the load. The relay devices 200 or the power receiving device 300 that has connected to the load transits a notification of stability to the power transmitting device 100, after stabilization of output. Upon receipt of the notification of stability, the power transmitting device 100 outputs a connection command to one of the relay devices 200 or the power receiving device 300 to which the load has not yet been connected. Thereafter, the same operations are repeated until power supply to the loads of all of the relay devices 200 and the power receiving device 300 is completed.

According to the present embodiment, the power transmitting device 100 can centrally control supply of power to the loads of each of the relay devices 200 and the power receiving device 300. Accordingly, there is the advantage that the loads can be driven in a more flexible manner, in addition to the advantage of the first and second embodiments of stability in operations when activating. Although the multiple loads are supplied with power one at a time, in the above example, control may be performed where power is supplied to each of multiple load groups, for example. The timing of connection to multiple loads is not restricted to the above-described example, and may be any timing as long as the connection timing of all loads is not the same.

As described above, the present disclosure includes the wireless power transmission system and transmission device according to the following items.

Item 1

A wireless power transmission system including:
  a power transmitting device;
  a power receiving device; and
  a relay device disposed between the power transmitting device and the power receiving device;
  the power transmitting device including
    a transmitting side inverter circuit that converts transmitting side DC power supplied from an external power source into transmitting side AC power, and
    a transmitting side power transmitting antenna that wirelessly transmits the transmitting side AC power,
  the relay device including
    a relay side power receiving antenna that receives the transmitting side AC power,
    a relay side rectifier that converts the transmitting side AC power into relay side DC power,
    a relay side inverter circuit that converts the relay side DC power into relay side AC power,
    a relay side load that is supplied at least part of the relay side DC power by the relay side rectifier,
    a relay side switch circuit that is disposed between the relay side rectifier and the relay side load, and that switches contact/non-contact state between the relay side rectifier and the relay side load, and
    a relay side power transmitting antenna that wirelessly transmits the relay side AC power,
  the power receiving device including
    a receiving side power receiving antenna that receives the relay side AC power,
    a receiving side rectifier that converts the relay side AC power into receiving side DC power,
    a receiving side load that is supplied at least part of the receiving side DC power by the receiving side rectifier, and
    a receiving side switch circuit that is disposed between the receiving side rectifier and the receiving side load, and that switches contact/non-contact state between the receiving side rectifier and the receiving side load, wherein in a state where the relay side switch circuit has the relay side rectifier and the relay side load in a non-contact state, and the receiving side switch circuit has the receiving side rectifier and the receiving side load in a non-contact state, the transmitting side AC power is transmitted from the transmitting side power transmitting antenna to the relay side power receiving antenna, and the relay side AC power is transmitted from the relay side power transmitting antenna to the receiving side power receiving antenna, and wherein after a voltage of the receiving side DC power reaching a requested voltage of the power receiving device, the receiving side switch circuit connects the receiving side rectifier to the receiving side load at a timing T2 that is different from a timing T1 at which the relay side switch circuit connects the relay side rectifier to the relay side load.

According to the above embodiment, connection of the relay side rectifier and relay side load, and connection of the receiving side rectifier and receiving side load, are performed after the voltage of the receiving side DC power reaches the requested voltage of the power receiving device. Further, connection of the former and connection of the latter are performed at different timings. Accordingly, operations at the time of activation can be performed in a more stable manner.

Item 2

The wireless power transmission system according to Item 1,
wherein the relay device further includes a relay side control circuit that controls the relay side switch circuit,
wherein the power receiving device further includes a receiving side control circuit that controls the receiving side switch circuit,
wherein the power transmitting device further includes a transmitting side control circuit that controls the relay side control circuit and the receiving side control circuit,
wherein the receiving side control circuit transmits a completion notification to the transmitting side control circuit to the effect that the voltage of the receiving side DC power has reached the requested voltage of the power receiving device,
and wherein, upon having received the completion notification from the receiving side control circuit, the transmitting side control circuit uses the receiving side control circuit to connect the receiving side rectifier to the receiving side load at a timing T2 that is different from a timing T1 at which the transmitting side control circuit uses the relay side control circuit to connect the relay side rectifier to the relay side load.

According to the above embodiment, upon having received the completion notification from the receiving side control circuit, the transmitting side control circuit uses the receiving side control circuit to connect the receiving side rectifier to the receiving side load at a timing T2 that is different from a timing T1 at which the transmitting side control circuit uses the relay side control circuit to connect the relay side rectifier to the relay side load. Thus, operations at the time of activation can be stabilized in a configuration where the power transmitting device controls the relay devices and the power receiving device.

Item 3

The wireless power transmission system according to either of Item 1 or 2,
wherein the timing T1 is earlier than the timing T2.

According to the above embodiment, power is supplied in order from the power transmitting device side (front side), so there is the advantage that control is easy.

Item 4

The wireless power transmission system according to either of Item 1 or 2,
wherein the timing T1 is later than the timing T2.

According to the above embodiment, power is supplied in order from the power receiving device side (back side), so there is the advantage that the system can be realized even without implementing bidirectional communication functions.

Item 5

The wireless power transmission system according to Item 1,
wherein the relay device further includes a relay side control circuit that controls the relay side switch circuit,
wherein the power receiving device further includes a receiving side control circuit that controls the receiving side switch circuit,
wherein the receiving side control circuit transmits a completion notification to the relay side control circuit to the effect that the voltage of the receiving side DC power has reached the requested voltage of the power receiving device,
and wherein, upon having received the completion notification, the relay side control circuit uses the receiving side control circuit to connect the receiving side rectifier to the receiving side load at a timing T2 that is later than a timing T1 at which the relay side rectifier and the relay side load are connected.

According to the above embodiment, power is supplied in order from the power transmitting device side (front side), so there is the advantage that control is simple.

Item 6

The wireless power transmission system according to any one of Items 1 through 5,
wherein the power receiving device further includes
a receiving side detector that detects the receiving side DC voltage, and
a receiving side control circuit that determines whether or not the voltage of the receiving side DC power has reached the requested voltage of the receiving side load of the power receiving device, based on the voltage of the receiving side DC voltage that the receiving side detector has detected.

According to the above embodiment, in a case where the voltage of the receiving side DC power has reached the requested voltage of the receiving side load, the receiving side control circuit can transmit a completion notification to a relay device or power transmitting device. The relay device or power transmitting device that has received this completion notification can connect to the load in a stable manner.

Item 7

A wireless power transmission system including:
a power transmitting device;
a power receiving device; and
an N number of relay devices (where N is an integer of 2 or larger) disposed between the power transmitting device and the power receiving device;
the power transmitting device including
a transmitting side inverter circuit that converts transmitting side DC power supplied from an external power source into transmitting side AC power, and
a transmitting side power transmitting antenna that wirelessly transmits the transmitting side AC power, a first relay device, out of the N relay devices, including
- a first relay side power receiving antenna that receives the transmitting side AC power,
- a first relay side rectifier that converts the transmitting side AC power into first relay side DC power,
- a first relay side inverter circuit that converts the first relay side DC power into first relay side AC power,
- a first relay side load that is supplied at least part of the first relay side DC power by the first relay side rectifier,
- a first relay side switch circuit that is disposed between the first relay side rectifier and the first relay side load, and that switches contact/non-contact state between the first relay side rectifier and the first relay side load, and
- a first relay side power transmitting antenna that wirelessly transmits the first relay side AC power, an i'th (where i=2 through N) relay device, out of the N relay devices, including
- an i'th relay side power receiving antenna that receives the i−1'th relay side AC power,
- an i'th relay side rectifier that converts the i−1'th relay side AC power into i'th relay side DC power,
- an i'th relay side inverter circuit that converts the i'th relay side DC power into i'th relay side AC power,
- an i'th relay side load that is supplied at least part of the i'th relay side DC power by the i'th relay side rectifier,
- an i'th relay side switch circuit that is disposed between the i'th relay side rectifier and i'th relay side load, and that switches contact/non-contact state between the i'th relay side rectifier and the i'th relay side load, and
- an i'th relay side power transmitting antenna that wirelessly transmits the i'th relay side AC power, the power receiving device including
- a receiving side power receiving antenna that receives the N'th relay side AC power,
- a receiving side rectifier that converts the N'th relay side AC power into receiving side DC power,
- a receiving side load that is supplied at least part of the receiving side DC power by the receiving side rectifier, and
- a receiving side switch circuit that is disposed between the receiving side rectifier and the receiving side load, and that switches contact/non-contact state between the receiving side rectifier and the receiving side load, wherein, in the wireless power transmission system, first, the i'th (where i=1 through N) switch circuit has the i'th (where i=1 through N) relay side rectifier and the i'th (where i=1 through N) relay side load in a non-contact state, and the receiving side switch circuit has the receiving side rectifier and the receiving side load in a non-contact state, the transmitting side AC power transmitted from the transmitting side power transmitting antenna is transmitted to the relay side power receiving antenna as the N'th AC power, sequentially via the i'th (where i=1 through N) relay device, and wherein the i'th (where i=1 through N) switch circuit connects the i'th (where i=1 through N) relay side rectifier to the i'th (where i=1 through N) relay side load at a timing Ti (where i=1 through N), and the receiving side switch circuit connects the receiving side rectifier to the receiving side load at a timing Tr, the timing Ti (where i=1 through N) and the timing Tr at least partially differing. A Item 8

The wireless power transmission system according to Item 7,
- wherein the i'th (where i=1 through N) relay device further includes an i'th (where i=1 through N) relay side control circuit that controls the i'th (where i=1 through N) relay side switch circuit,
- wherein the power receiving device further includes a receiving side control circuit that controls the receiving side switch circuit,
- wherein the power transmitting device further includes a transmitting side control circuit that controls the i'th (where i=1 through N) relay side control circuit and the receiving side control circuit,
- wherein the receiving side control circuit transmits a completion notification to the transmitting side control circuit to the effect that the voltage of the receiving side DC power has reached the requested voltage of the power receiving device,
- and wherein, upon having received the completion notification from the receiving side control circuit, the transmitting side control circuit turns on the i'th (where i=1 through N) switch circuit at a timing Ti (where i=1 through N) and connects the i'th (where i=1 through N) relay side rectifier to the i'th (where i=1 through N) relay side load, and turns the receiving side switch circuit on at a timing Tr and connects the receiving side rectifier to the receiving side load, the timing Ti (where i=1 through N) and the timing Tr at least partially differing.

According to the above embodiment, upon having received the completion notification from the receiving side control circuit, the transmitting side control circuit turns on the i'th (where i=1 through N) switch circuit at a timing Ti (where i=1 through N) and connects the i'th (where i=1 through N) relay side rectifier to the i'th (where i=1 through N) relay side load, and turns the receiving side switch circuit on at a timing Tr and connects the receiving side rectifier to the receiving side load, the timing Ti (where i=1 through N) and the timing Tr at least partially differing. Thus, operations at the time of activation can be stabilized in a configuration where the power transmitting device controls the relay devices and the power receiving device.

Item 9

The wireless power transmission system according to either of Item 7 or 8,
- wherein the timing Ti (where i=2 through N) is earlier than the timing Ti−1,
- and wherein the timing Tr is earlier than the timing TN.

According to the above embodiment, power is supplied in order from the power receiving device side (back side), so there is the advantage that the system can be realized even without implementing bidirectional communication functions.

Item 10

The wireless power transmission system according to Item 7,
- wherein the i'th (where i=1 through N) relay device further includes an i'th (where i=1 through N) relay side control circuit that controls the i'th (where i=1 through N) relay side switch circuit,
- wherein the power receiving device further includes a receiving side control circuit that controls the receiving side switch circuit,
- wherein the receiving side control circuit transmits a first information to the N'th relay side control circuit to the effect that the voltage of the receiving side DC power has reached the requested voltage of the power receiving device, wherein the i'th (where i=2 through N) relay side control circuit transmits a second information to the i−1'th (where i=2 through N) relay side control circuit to the effect that the voltage of the i'th (where i=2 through N) relay side DC power has reached the requested voltage of the i'th (where i=2 through N) relay device, wherein, upon having received the first information, the N'th relay side control circuit connects the N'th relay side rectifier to the N'th relay side load at a timing TN that is later than the timing Tr, and wherein, upon having received the i+1'th (where i=1 through N−1) second information, the i'th (where i=1 through N) relay side control circuit sequentially connects the i'th (where i=1 through N−1) relay side rectifier to the i'th (where i=1 through N−1) relay side load at a timing Ti that is later than the timing Ti+1.

According to the above embodiment, power is supplied in order from the power receiving device side (back side), so there is the advantage that the system can be realized even without implementing bidirectional communication functions.

Note that "requested voltage of the relay device" in this Item is a predetermined voltage value that the relay device has requested. The "requested voltage of the relay device" may be a voltage value at the time of voltage within the relay device having stabilized after connection of the relay side rectifying circuit and relay side load of the relay device being connected. In this case, the "second information" corresponds to the "notification of stability" illustrated in FIG. 13B. In the same way, in some embodiments, the "first information" corresponds to the "notification of stability" illustrated in FIG. 13B.

The present technology is applicable to devices which require data transmission along with power supply, such as surveillance cameras, robots, and so forth, for example.

What is claimed is:

1. A wireless power transmission system comprising:
a power transmitting device;
a power receiving device; and
a relay device disposed between the power transmitting device and the power receiving device;
the power transmitting device including
  a transmitting side inverter circuit that converts transmitting side DC power supplied from an external power source into transmitting side AC power, and
  a transmitting side power transmitting antenna that wirelessly transmits the transmitting side AC power,
the relay device including
  a relay side power receiving antenna that receives the transmitting side AC power,
  a relay side rectifier that converts the transmitting side AC power into relay side DC power,
  a relay side inverter circuit that converts the relay side DC power into relay side AC power,
  a relay side load that is supplied at least part of the relay side DC power by the relay side rectifier,
  a relay side switch circuit that is disposed between the relay side rectifier and the relay side load, and that switches contact/non-contact state between the relay side rectifier and the relay side load, and
  a relay side power transmitting antenna that wirelessly transmits the relay side AC power,
the power receiving device including
  a receiving side power receiving antenna that receives the relay side AC power,
  a receiving side rectifier that converts the relay side AC power into receiving side DC power,
  a receiving side load that is supplied at least part of the receiving side DC power by the receiving side rectifier, and
  a receiving side switch circuit that is disposed between the receiving side rectifier and the receiving side load, and that switches contact/non-contact state between the receiving side rectifier and the receiving side load,
wherein in a state where the relay side switch circuit has the relay side rectifier and the relay side load in a non-contact state, and the receiving side switch circuit has the receiving side rectifier and the receiving side load in a noncontact state, the transmitting side AC power is transmitted from the transmitting side power transmitting antenna to the relay side power receiving antenna, and the relay side AC power is transmitted from the relay side power transmitting antenna to the receiving side power receiving antenna,
wherein after a voltage of the receiving side DC power reaching a requested voltage of the power receiving device, the receiving side switch circuit connects the receiving side rectifier to the receiving side load at a timing T2 that is different from a timing T1 at which the relay side switch circuit connects the relay side rectifier to the relay side load;
wherein the relay device further includes a relay side control circuit that controls the relay side switch circuit,
wherein the power receiving device further includes a receiving side control circuit that controls the receiving side switch circuit,
wherein the power transmitting device further includes a transmitting side control circuit that controls the relay side control circuit and the receiving side control circuit,
wherein the receiving side control circuit transmits a completion notification to the transmitting side control circuit to the effect that the voltage of the receiving side DC power has reached the requested voltage of the power receiving device, and
wherein, upon having received the completion notification from the receiving side control circuit, the transmitting side control circuit uses the receiving side control circuit to connect the receiving side rectifier to the receiving side load at a timing T2 that is different from a timing T1 at which the transmitting side control circuit uses the relay side control circuit to connect the relay side rectifier to the relay side load.

2. The wireless power transmission system according to claim 1,
wherein the timing T1 is earlier than the timing T2.

3. The wireless power transmission system according to claim 1,
wherein the timing T1 is later than the timing T2.

4. A wireless power transmission system comprising:
a power transmitting device;
a power receiving device; and
a relay device disposed between the power transmitting device and the power receiving device;
the power transmitting device including
  a transmitting side inverter circuit that converts transmitting side DC power supplied from an external power source into transmitting side AC power, and a transmitting side power transmitting antenna that wirelessly transmits the transmitting side AC power, the relay device including
- a relay side power receiving antenna that receives the transmitting side AC power,
- a relay side rectifier that converts the transmitting side AC power into relay side DC power,
- a relay side inverter circuit that converts the relay side DC power into relay side AC power,
- a relay side load that is supplied at least part of the relay side DC power by the relay side rectifier,
- a relay side switch circuit that is disposed between the relay side rectifier and the relay side load, and that switches contact/non-contact state between the relay side rectifier and the relay side load, and
- a relay side power transmitting antenna that wirelessly transmits the relay side AC power, the power receiving device including
- a receiving side power receiving antenna that receives the relay side AC power,
- a receiving side rectifier that converts the relay side AC power into receiving side DC power,
- a receiving side load that is supplied at least part of the receiving side DC power by the receiving side rectifier, and
- a receiving side switch circuit that is disposed between the receiving side rectifier and the receiving side load, and that switches contact/non-contact state between the receiving side rectifier and the receiving side load, wherein in a state where the relay side switch circuit has the relay side rectifier and the relay side load in a non-contact state, and the receiving side switch circuit has the receiving side rectifier and the receiving side load in a noncontact state, the transmitting side AC power is transmitted from the transmitting side power transmitting antenna to the relay side power receiving antenna, and the relay side AC power is transmitted from the relay side power transmitting antenna to the receiving side power receiving antenna, wherein after a voltage of the receiving side DC power reaching a requested voltage of the power receiving device, the receiving side switch circuit connects the receiving side rectifier to the receiving side load at a timing T2 that is different from a timing T1 at which the relay side switch circuit connects the relay side rectifier to the relay side load;

wherein the relay device further includes a relay side control circuit that controls the relay side switch circuit, wherein the power receiving device further includes a receiving side control circuit that controls the receiving side switch circuit, wherein the receiving side control circuit transmits a completion notification to the relay side control circuit to the effect that the voltage of the receiving side DC power has reached the requested voltage of the power receiving device, and wherein, upon having received the completion notification, the relay side control circuit uses the receiving side control circuit to connect the receiving side rectifier to the receiving side load at a timing T2 that is later than a timing T1 at which the relay side rectifier and the relay side load are connected.

5. The wireless power transmission system according to claim 1, wherein the power receiving device further includes
- a receiving side detector that detects the receiving side DC voltage, and
- a receiving side control circuit that determines whether or not the voltage of the receiving side DC power has reached the requested voltage of the receiving side load of the power receiving device, based on the voltage of the receiving side DC voltage that the receiving side detector has detected.

6. A wireless power transmission system comprising:
a power transmitting device;
a power receiving device; and
N number of relay devices (where N is an integer of 2 or larger) disposed between the power transmitting device and the power receiving device;

the power transmitting device including
- a transmitting side inverter circuit that converts transmitting side DC power supplied from an external power source into transmitting side AC power, and
- a transmitting side power transmitting antenna that wirelessly transmits the transmitting side AC power, a first relay device, out of the N relay devices, including
- a first relay side power receiving antenna that receives the transmitting side AC power,
- a first relay side rectifier that converts the transmitting side AC power into first relay side DC power,
- a first relay side inverter circuit that converts the first relay side DC power into first relay side AC power,
- a first relay side load that is supplied at least part of the first relay side DC power by the first relay side rectifier,
- a first relay side switch circuit that is disposed between the first relay side rectifier and the first relay side load, and that switches contact/non-contact state between the first relay side rectifier and the first relay side load, and
- a first relay side power transmitting antenna that wirelessly transmits the first relay side AC power, an i'th (where i=2 through N) relay device, out of the N relay devices, including
- an i'th relay side power receiving antenna that receives the i−1'th relay side AC power,
- an i'th relay side rectifier that converts the i−1'th relay side AC power into i'th relay side DC power,
- an i'th relay side inverter circuit that converts the i'th relay side DC power into i'th relay side AC power,
- an i'th relay side load that is supplied at least part of the i'th relay side DC power by the i'th relay side rectifier,
- an i'th relay side switch circuit that is disposed between the i'th relay side rectifier and i'th relay side load, and that switches contact/non-contact state between the i'th relay side rectifier and the i'th relay side load, and
- an i'th relay side power transmitting antenna that wirelessly transmits the i'th relay side AC power, the power receiving device including
- a receiving side power receiving antenna that receives the N'th relay side AC power,
- a receiving side rectifier that converts the N'th relay side AC power into receiving side DC power,
- a receiving side load that is supplied at least part of the receiving side DC power by the receiving side rectifier, and
- a receiving side switch circuit that is disposed between the receiving side rectifier and the receiving side load, and that switches contact/non-contact state between the receiving side rectifier and the receiving side load, wherein, in the wireless power transmission system, first, the i'th (where i=1 through N) switch circuit has the i'th (where i=1 through N) relay side rectifier and the i'th (where i=1 through N) relay side load in a non-contact state, and the receiving side switch circuit has the receiving side rectifier and the receiving side load in a non-contact state, the transmitting side AC power transmitted from the transmitting side power transmitting antenna is transmitted to the relay side power receiving antenna as the N'th AC power, sequentially via the i'th (where i=1 through N) relay device, wherein the i'th (where i=1 through N) switch circuit connects the i'th (where i=1 through N) relay side rectifier to the i'th (where i=1 through N) relay side load at a timing Ti (where i=1 through N), and the receiving side switch circuit connects the receiving side rectifier to the receiving side load at a timing Tr, the timing Tr differing from at least one of the timing Ti (where i=1 through N), wherein the i'th (where i=1 through N) relay device further includes an i'th (where i=1 through N) relay side control circuit that controls the i'th (where i=1 through N) relay side switch circuit, wherein the power receiving device further includes a receiving side control circuit that controls the receiving side switch circuit, wherein the power transmitting device further includes a transmitting side control circuit that controls the i'th (where i=1 through N) relay side control circuit and the receiving side control circuit, wherein the receiving side control circuit transmits a completion notification to the transmitting side control circuit to the effect that the voltage of the receiving side DC power has reached the requested voltage of the power receiving device, and wherein, upon having received the completion notification from the receiving side control circuit, the transmitting side control circuit turns on the i'th (where i=1 through N) switch circuit at a timing Ti (where i=1 through N) and connects the i'th (where i=1 through N) relay side rectifier to the i'th (where i=1 through N) relay side load, and turns the receiving side switch circuit on at a timing Tr and connects the receiving side rectifier to the receiving side load, the timing Tr differing from at least one of the timing Ti (where i=1 through N).

7. The wireless power transmission system according to claim 6, wherein the timing Ti (where i=2 through N) is earlier than the timing Ti−1, and wherein the timing Tr is earlier than the timing TN.

8. A wireless power transmission system comprising:

a power transmitting device;

a power receiving device; and

N number of relay devices (where N is an integer of 2 or larger) disposed between the power transmitting device and the power receiving device;

the power transmitting device including
 a transmitting side inverter circuit that converts transmitting side DC power supplied from an external power source into transmitting side AC power, and
 a transmitting side power transmitting antenna that wirelessly transmits the transmitting side AC power, a first relay device, out of the N relay devices, including
 a first relay side power receiving antenna that receives the transmitting side AC power,
 a first relay side rectifier that converts the transmitting side AC power into first relay side DC power,
 a first relay side inverter circuit that converts the first relay side DC power into first relay side AC power,
 a first relay side load that is supplied at least part of the first relay side DC power by the first relay side rectifier,
 a first relay side switch circuit that is disposed between the first relay side rectifier and the first relay side load, and that switches contact/non-contact state between the first relay side rectifier and the first relay side load, and
 a first relay side power transmitting antenna that wirelessly transmits the first relay side AC power, an i'th (where i=2 through N) relay device, out of the N relay devices, including
 an i'th relay side power receiving antenna that receives the i−1'th relay side AC power,
 an i'th relay side rectifier that converts the i−1'th relay side AC power into i'th relay side DC power,
 an i'th relay side inverter circuit that converts the i'th relay side DC power into i'th relay side AC power,
 an i'th relay side load that is supplied at least part of the i'th relay side DC power by the i'th relay side rectifier,
 an i'th relay side switch circuit that is disposed between the i'th relay side rectifier and i'th relay side load, and that switches contact/non-contact state between the i'th relay side rectifier and the i'th relay side load, and
 an i'th relay side power transmitting antenna that wirelessly transmits the i'th relay side AC power, the power receiving device including
 a receiving side power receiving antenna that receives the N'th relay side AC power,
 a receiving side rectifier that converts the N'th relay side AC power into receiving side DC power,
 a receiving side load that is supplied at least part of the receiving side DC power by the receiving side rectifier, and
 a receiving side switch circuit that is disposed between the receiving side rectifier and the receiving side load, and that switches contact/non-contact state between the receiving side rectifier and the receiving side load, wherein, in the wireless power transmission system, first, the i'th (where i=1 through N) switch circuit has the i'th (where i=1 through N) relay side rectifier and the i'th (where i=1 through N) relay side load in a non-contact state, and the receiving side switch circuit has the receiving side rectifier and the receiving side load in a non-contact state, the transmitting side AC power transmitted from the transmitting side power transmitting antenna is transmitted to the relay side power receiving antenna as the N'th AC power, sequentially via the i'th (where i=1 through N) relay device, wherein the i'th (where i=1 through N) switch circuit connects the i'th (where i=1 through N) relay side rectifier to the i'th (where i=1 through N) relay side load at a timing Ti (where i=1 through N), and the receiving side switch circuit connects the receiving side rectifier to the receiving side load at a timing Tr, the timing Tr differing from at least one of the timing Ti (where i=1 through N), wherein the i'th (where i=1 through N) relay device further includes an i'th (where i=1 through N) relay side control circuit that controls the i'th (where i=1 through N) relay side switch circuit, wherein the power receiving device further includes a receiving side control circuit that controls the receiving side switch circuit, wherein the receiving side control circuit transmits a first information to the N'th relay side control circuit to the effect that the voltage of the receiving side DC power has reached the requested voltage of the power receiving device, wherein the i'th (where i=2 through N) relay side control circuit transmits a second information to the i−1'th (where i=2 through N) relay side control circuit to the effect that the voltage of the i'th (where i=2 through N) relay side DC power has reached the requested voltage of the i'th (where i=2 through N) relay device, wherein, upon having received the first information, the N'th relay side control circuit connects the N'th relay side rectifier to the N'th relay side load at a timing TN that is later than the timing Tr, and wherein, upon having received the i+1'th (where i=1 through N−1) second information, the i'th (where i=1 through N) relay side control circuit sequentially connects the i'th (where i=1 through N−1) relay side rectifier to the i'th (where i=1 through N−1) relay side load at a timing Ti that is later than the timing Ti+1.

* * * * *